Sept. 2, 1952 G. R. STIBITZ 2,609,143
ELECTRONIC COMPUTER FOR ADDITION AND SUBTRACTION
Filed June 24, 1948 7 Sheets-Sheet 1

INVENTOR.
George R. Stibitz
BY
Carlson, Pitney, Hubbard & Wolfe
ATTORNEYS

Sept. 2, 1952 G. R. STIBITZ 2,609,143
ELECTRONIC COMPUTER FOR ADDITION AND SUBTRACTION
Filed June 24, 1948 7 Sheets-Sheet 2
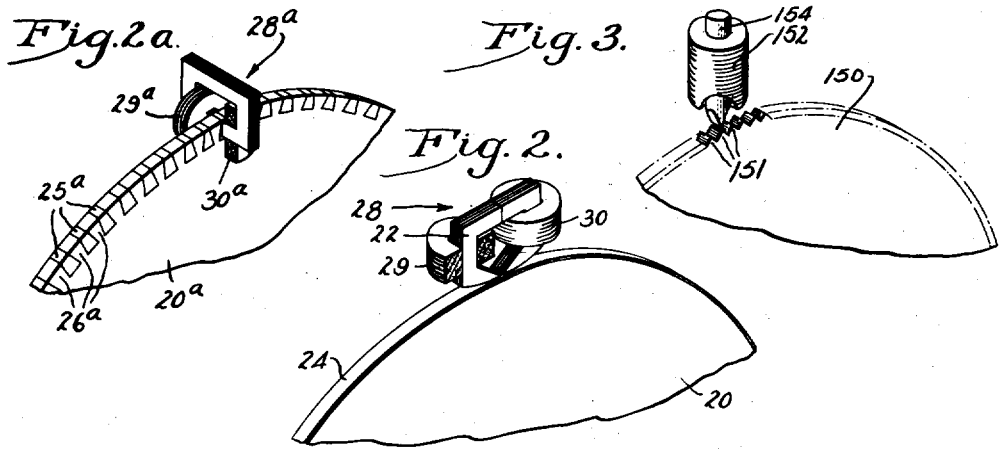
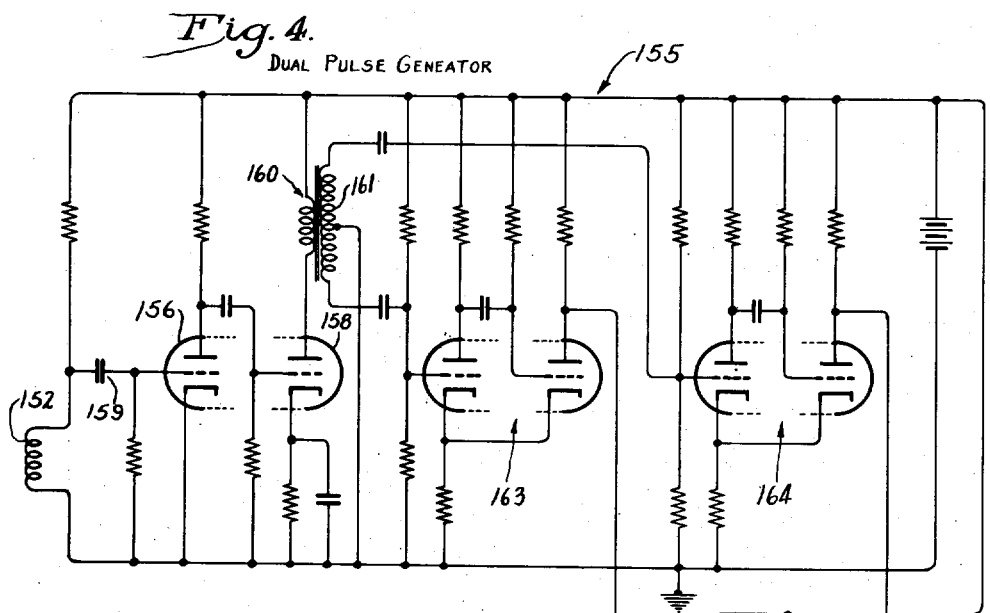
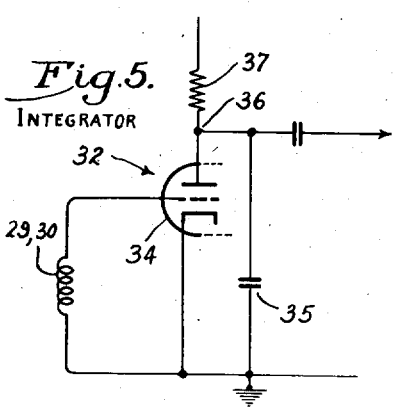
INVENTOR.
George R. Stibitz
BY
Carlson, Pitzner, Hubbard & Wolfe
ATTORNEYS Sept. 2, 1952          G. R. STIBITZ          2,609,143
ELECTRONIC COMPUTER FOR ADDITION AND SUBTRACTION
Filed June 24, 1948          7 Sheets—Sheet 3
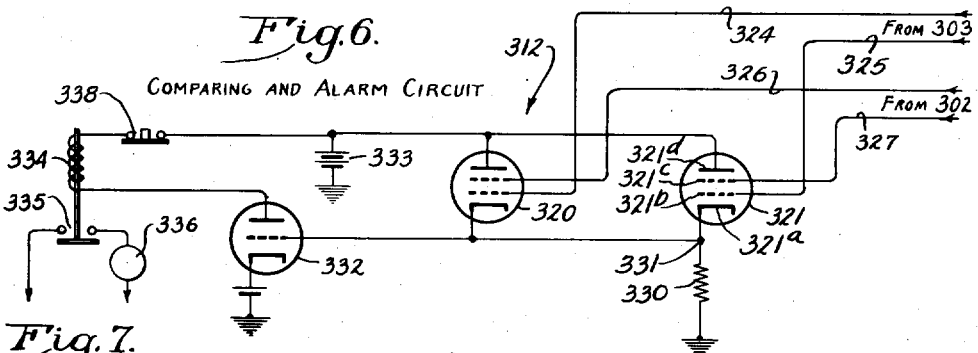
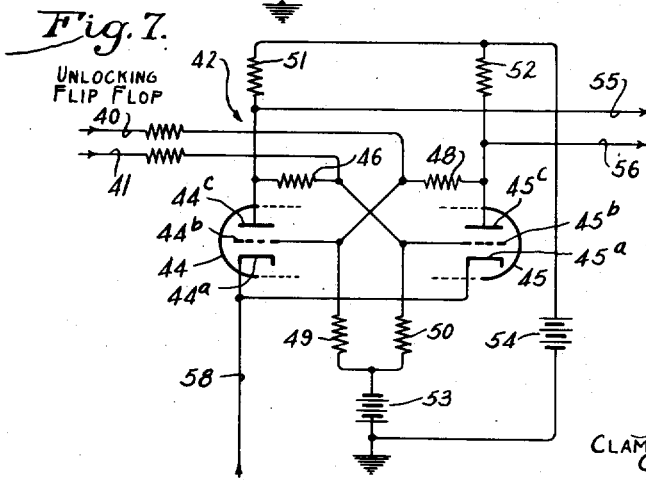
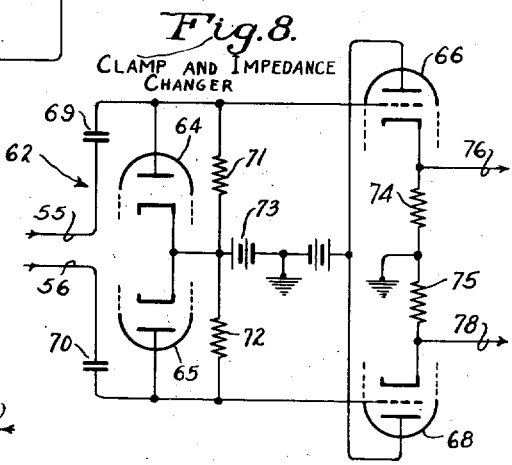
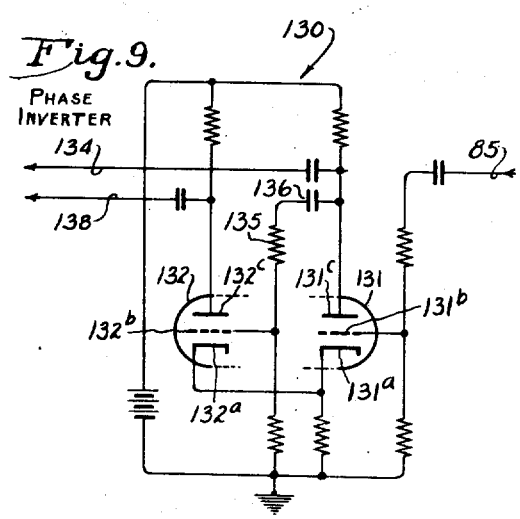
INVENTOR.
George R. Stibitz
BY
ATTORNEYS Sept. 2, 1952  G. R. STIBITZ  2,609,143
ELECTRONIC COMPUTER FOR ADDITION AND SUBTRACTION
Filed June 24, 1948  7 Sheets-Sheet 4

INVENTOR.
George R. Stibitz
BY
Carlson, Pitzner, Hubbard & Wolfe
ATTORNEYS

Sept. 2, 1952  G. R. STIBITZ  2,609,143
ELECTRONIC COMPUTER FOR ADDITION AND SUBTRACTION
Filed June 24, 1948  7 Sheets-Sheet 6

INVENTOR.
George R. Stibitz
BY
Carlson, Petgrau, Hubbard & Wolfe
ATTORNEYS

Sept. 2, 1952 G. R. STIBITZ 2,609,143
ELECTRONIC COMPUTER FOR ADDITION AND SUBTRACTION
Filed June 24, 1948 7 Sheets-Sheet 7

INVENTOR.
George R. Stibitz
BY
Carlson, Pitzner, Hubbard & Wolfe
ATTORNEYS

Patented Sept. 2, 1952

2,609,143

UNITED STATES PATENT OFFICE 2,609,143

ELECTRONIC COMPUTER FOR ADDITION AND SUBTRACTION

George R. Stibitz, Burlington, Vt.

Application June 24, 1948, Serial No. 34,968

44 Claims. (Cl. 235—61)

The present invention relates to electronic digital computers and more particularly to a device for performing the addition or subtraction of binary numbers.

It is an object of the invention to provide an improved device for adding and subtracting binary numbers at a rate of speed which is far in excess of present day commercial calculators.

It is another object of the invention to provide an improved sequential computer in which binary numbers are added by successive operation on each ordinal place with provision for automatically carrying a digit from one order to the next. It is a more specific object to provide a computer which acts in turn on each of the digits comprising a binary number, and which includes a novel delay circuit which is synchronized to cause a carried digit to be precisely delayed until the instant of summation of digits in the next highest order.

It is still another object to provide an adding and subtracting device which is simple and inexpensive to construct, which is compact, and which may be advantageously utilized as a building block in the construction of computers for other mathematical operations, such as multiplication and division. Neither the mechanical nor the electrical components need be constructed with extreme precision and the electrical components are, for the most part, of the standard type used in radio receivers. The number of tubes and other parts is small as compared to conventional computers of comparable speed.

It is a further object to provide an improved computer employing the binary system of numbers and utilizing devices having two stable conditions of operation in which the order of the two conditions or voltages to which the devices are subjected rather than any single instantaneous condition or voltage determines which of the two binary digits is represented. As a result the computer may be made self-checking and of great accuracy in spite of relatively wide variations in voltage, phasing and wave form in the various portions of the circuit and notwithstanding changes in the electrical characteristics of tubes and other component parts.

It is a related object to provide a novel delay and comparing circuit for sounding an alarm whenever one of the two conditions comprising a digit is lacking.

It is a still further object to provide an improved means for the magnetic storage of information and a drive therefor which enables synchronization not only between various problem data but also with control impulses acting upon such data and in spite of wide variations in driving speed.

It is an object to provide a computer of the sequential type which is capable of performing addition operations upon successive pairs of long binary numbers in rapid sequence without danger that a carry signal from the highest order in one sum will be carried over to the lowest order of the next sum. It is an allied object to provide a computer in which the complement of a binary number may be readily derived for purposes of subtraction and in which the complement is so compensated that the difference obtained is absolutely accurate regardless of the number of binal places the device may be equipped to handle.

It is an aim of the invention in one of its aspects to provide an improved summing circuit including alternative embodiments thereof which is capable of producing write and carry voltages in response to voltages representative of binary digits to be added and in accordance with the rules governing binary addition.

Other objects and advantages of the invention will become apparent upon studying the following discussion and inspection of the drawings, in which:

Fig. 2 is a fragmentary view of one of the storage disks disclosed in Fig. 1 and showing magnetic material distributed about the periphery thereof together with a cooperating recording or pickup head.

Fig. 2a is similar to Fig. 2 but shows the use of separate magnetic elements for storage purposes.

Fig. 3 is a fragmentary view showing the pulsing disk employed in Fig. 1.

Fig. 4 is a schematic diagram of a dual pulse generator controlled by the pulsing disk of Fig. 3.

Fig. 5 is a schematic diagram of a preferred integrator circuit employed herein.

Fig. 6 shows a comparing and alarm circuit for detecting possible errors in the operation of the system of Fig. 1.

Fig. 7 shows a modified flip-flop circuit employed in the present invention.

Fig. 8 shows a clamping and impedance changing circuit.

Fig. 9 shows a preferred form of phase inverter used to produce an inversion or complement of the main data signals.

Figure 10:
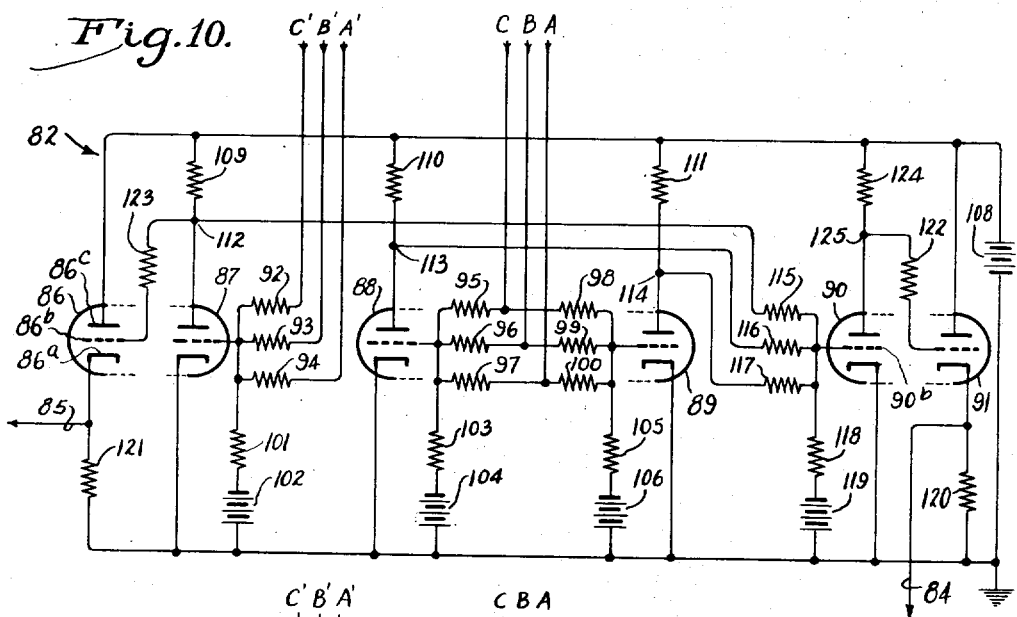

Fig. 10 discloses a summing circuit in accordance with the present invention and employing three-element vacuum tubes.

Figure 1:
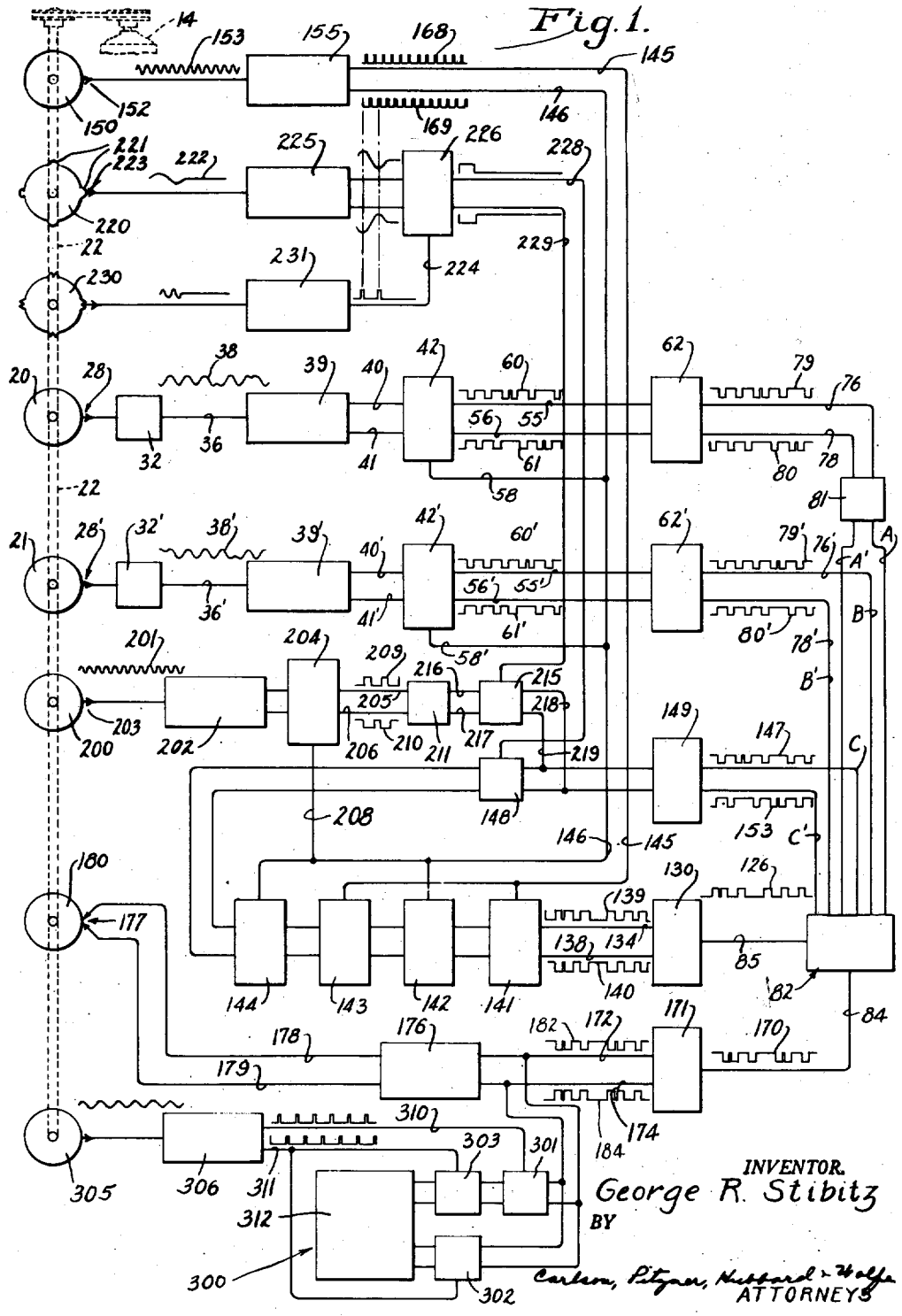
Figure 1 is a block diagram of a computer constructed in accordance with the present invention and suitable for adding or subtracting numbers stored in binary notation.
Figure 10A:
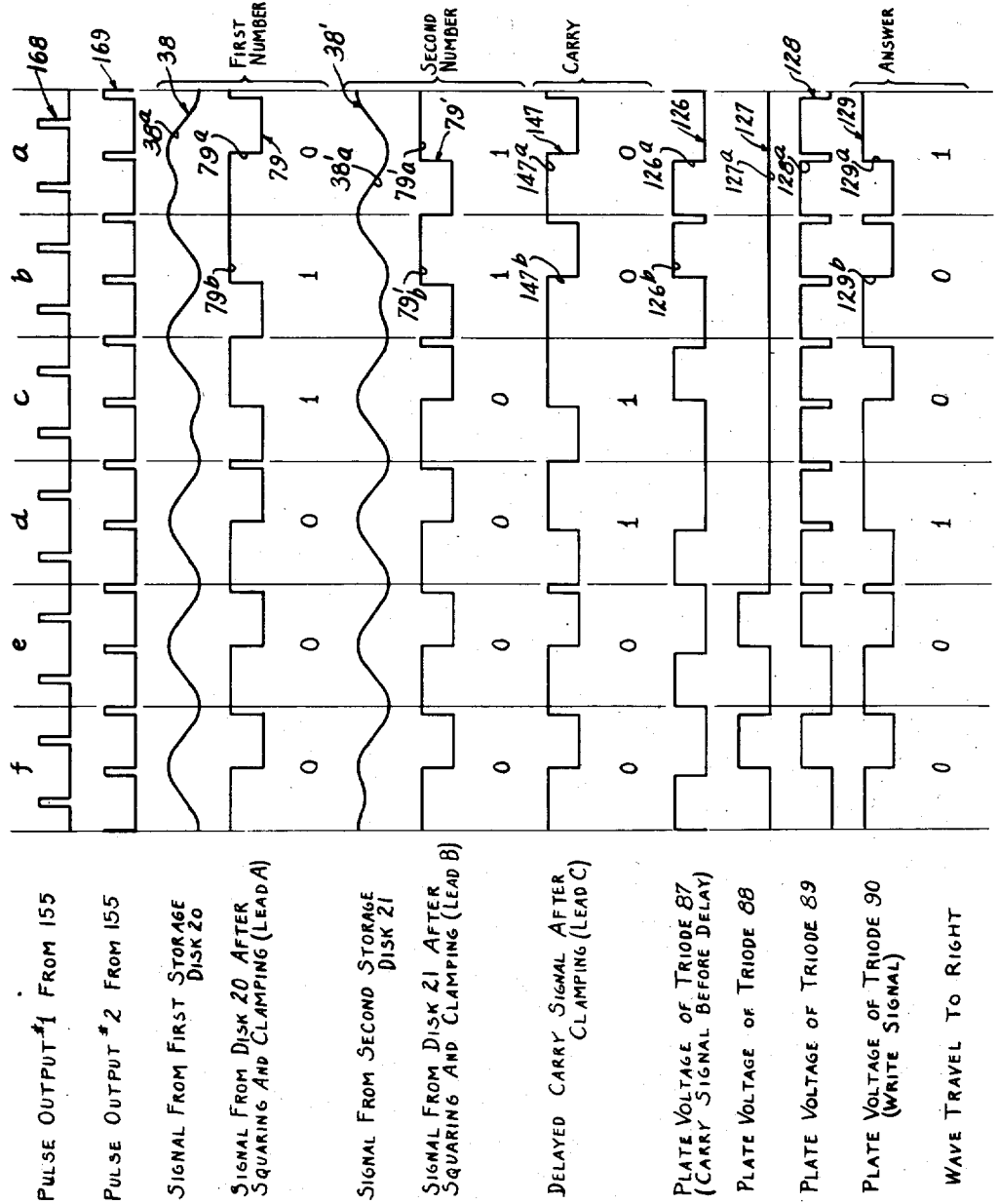

Fig. 10a is a set of wave forms existing at various significant points in the circuit of Fig. 10 and the system of Fig. 1.

Figure 11:
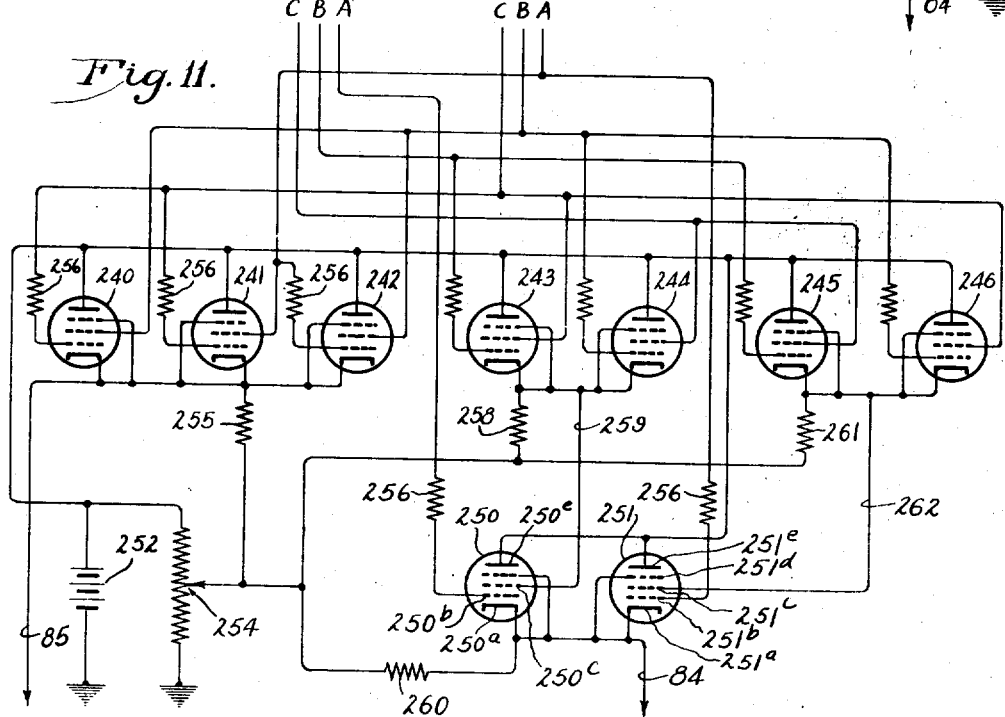

Fig. 11 is an alternative summing circuit which differs from that of Fig. 10 in that multi-grid tubes are used.

Figure 11A:
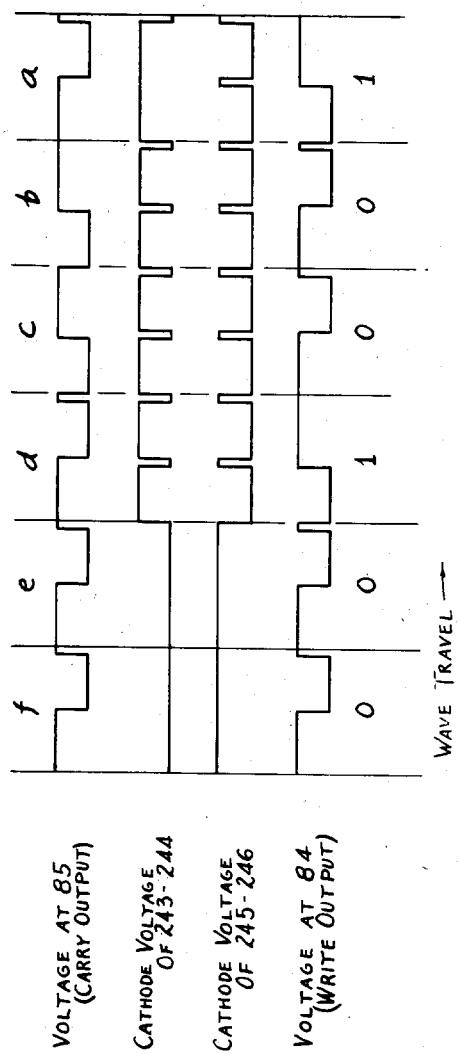

Fig. 11a is a set of wave forms of the same general type as shown in Fig. 10 but applicable to the circuit of Fig. 11.

Figure 12:
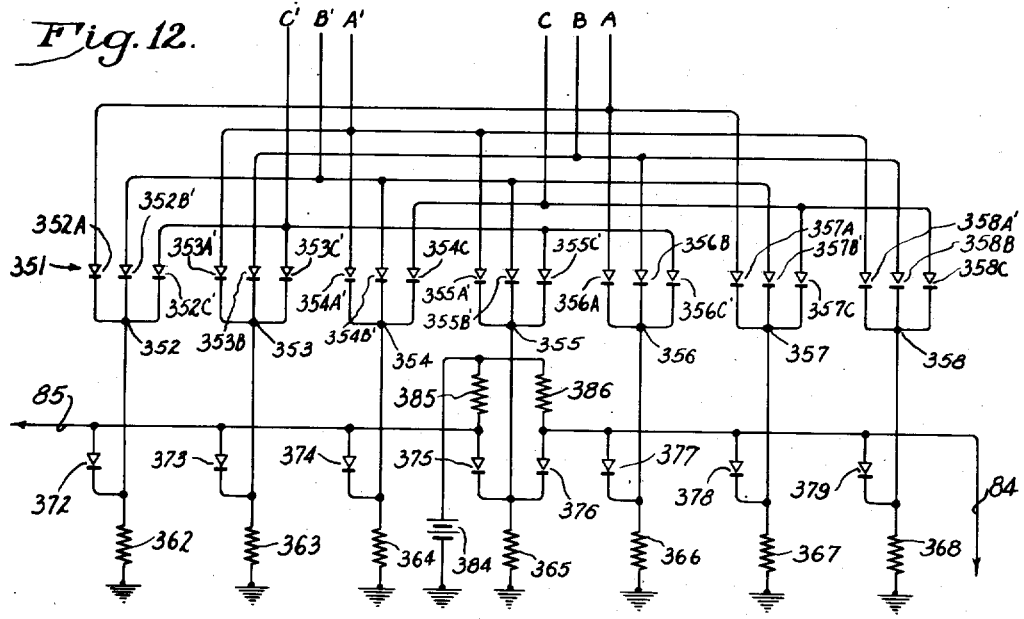

Fig. 12 is another alternative summing circuit.

Figure 12A:
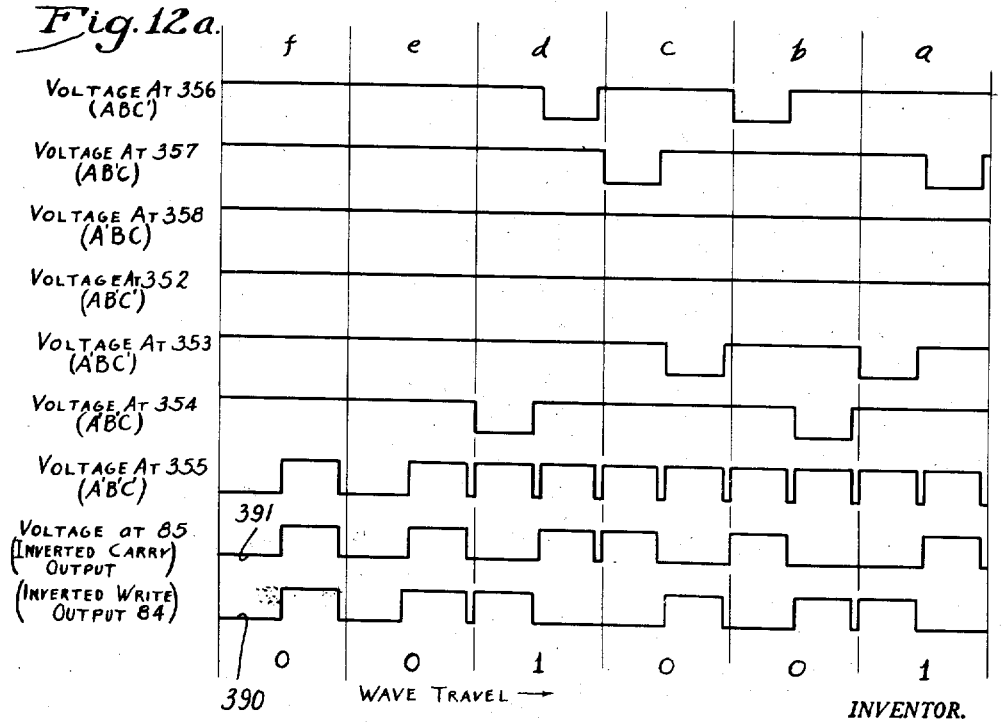

Fig. 12a is a set of wave forms for assistance in understanding the operation of the circuit of Fig. 12.

Figure 13:
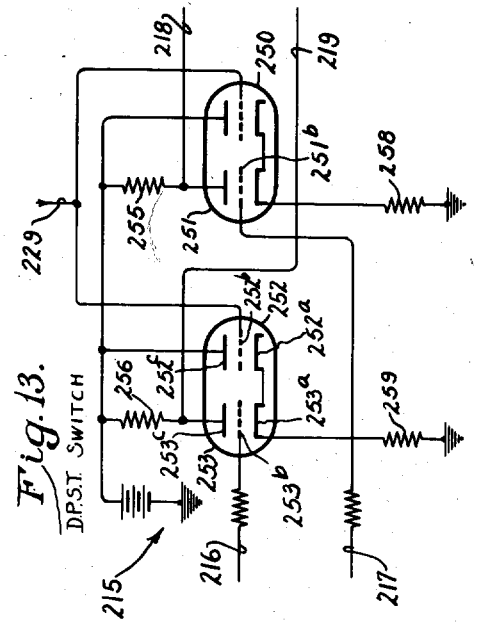

Fig. 13 is a double pole single throw electronic switch employed in the system for insertion of digits in the lowest order.

While the invention is susceptible of various modifications and alternative constructions and uses, I have shown in the drawings and will herein describe in detail only certain preferred embodiments of the invention. It is to be understood, however, that I do not intend to limit the invention by such disclosure but aim to cover all modifications and alternative constructions and uses falling within the spirit and scope of the invention as expressed in the appended claims.

The computer to be described employs the binary system of numbers and it will be assumed that such system is sufficiently well known to any persons skilled in the computer art as not to require discussion. Complete information on the binary system may be obtained from the various mathematical texts and texts concerning the theory of numbers. As is conventional, the two binary digits employed will be referred to as 0 (zero) and 1 (one) in the discussion which follows.

Electronic computers employing binary numbers are known and have been useful for calculating trajectory and for solving other lengthy mathematical problems. They have for the most part been relatively complicated and expensive, requiring so many vacuum tubes and related components and occupying so much space as to be completely unsuited for use in the average business establishment. As a result, problems involving payroll calculation, the solution of engineering design problems, and the like have been performed either manually or by the use of computers of the mechanical or electromagnetic relay types.

One of the reasons for the inherent complexity of prior art electronic computers is the manner in which the terms making up a lengthy binary number are treated. Conventionally binary computers have used two-condition devices such as flip-flop circuits in which each term of a binary number is represented by one of the two conditions. That is to say, representation of a lengthy binary number has required the use of a series of two-condition devices, one for each binary place. Since binary numbers have more than three times as many ordinal places as their decimal equivalents, the number of tubes required quickly reaches an impracticable level. Further, since tubes are subject to failure and erratic operation after extended periods of use, servicing is a difficult matter and it is almost impossible to obtain continued accuracy without resorting to elaborate checking schemes.

In the computer to be discussed two-condition devices are used to represent each digit with the order of the two conditions determining which binary digit is represented. Assuming that the digit is to be represented by plus or minus voltages on a certain lead, it has been found desirable to arbitrarily represent a binary 1 by a plus voltage followed at a predetermined interval by a minus voltage and, conversely, to represent a binary 0 by a minus voltage followed at a predetermined interval by a plus voltage. Novel means are provided for timing the computation so that there is no possibility of reading the second condition as the first condition of a pair. In order to simplify the description, this two-condition representation of a digit will be referred to as a "couple" or "wave." The terms "plus-minus couple" and "minus-plus couple" indicates the nature of the pulse, i. e., the direction of polarity change in pulses constituting a 1 and a 0 respectively on the main data leads. The two-condition couples may be stored in a variety of forms without departing from the invention. I prefer to store the couples magnetically.

One of the advantages of the manner of representing a digit as employed herein and as later covered in detail, is that it enables a simple and reliable check on each digit of the answer. Thus, if trouble develops at any point in the device which would cause one of the two condition devices to remain in one of its conditions, such fact is made immediately apparent, whereas in more conventional systems, failure of a single two-condition device simply produces an error in the answer without warning that an error existed.

As an additional characteristic, the device disclosed herein operates upon the terms of a binary number sequentially or serially rather than simultaneously. If it is assumed, for example, that two binary numbers are to be added, the computer, as a first step, adds the terms of lowest order (normally the first digit to the left of the binal point) progressing order by order to the highest term in each number. The lowest order digits of the two numbers are fed into a summing circuit. The sum of the two digits exists as a couple at the output of the summing circuit, the couple representing a digit which is then stored as the lowest order digit of the answer. There also appears at the output of the summing circuit a carry signal in the form of a couple the nature of which indicates whether a 1 or a 0 is to be carried to the next highest order. The sum of the digits in the next highest order is then obtained with the carry signal added thereto. The output of the summing circuit in the second operation is likewise in the form of a couple representing a digit which is recorded as the second term of the answer together with a carry signal which is added to the sum obtained in the third order. The summation of two binary numbers thus progresses until each term has been acted upon and the final answer is recorded. In the event that subtraction rather than addition is required, the device incorporates provision for obtaining the complement of the subtrahend, which is compensated in a particular manner, and thereafter performing the process of addition as outlined above.

The invention is also concerned with a novel means for storing the binary numbers to be operated upon and for recording the sum. Such storing means is of an improved form in which synchronization is substantially perfect not only as between the various storage and recording components but also with respect to the electrical circuit components. Further, synchronized means are provided for delayed insertion of the carry signal obtained from the summation of the digits in one order into the sum of the digits of the next highest order. Delay circuits are employed in the latter which are unlocked at precisely synchronized intervals with respect to functions performed by the remaining components and under optimum input conditions so that there is substantially no possibility of error.

Prior to discussing the complete computer shown in block form in Fig. 1, it will be helpful to consider the various subcombinations into which it may be conveniently divided. Such subcombinations include (a) means for storing the binary numbers to be added or subtracted, (b) means for deriving a data signal in the form of couples of alternating polarity and for shaping the same, (c) means including a summing circuit controlled by the couples and producing the answer in the form of couples at the output thereof, (d) a delay circuit for "carrying" from one order to the next, and (e) means for storing the complete answer. As ancillary but none the less important features, provision is made for (f) producing timing or unlocking pulses, (g) for reversing the couples comprising a number to be subtracted thereby obtaining its complement and (h) for eliminating difficulties caused by the "fugitive one" arising in both addition and subtraction. Finally there is provided an alarm circuit (i) of novel and improved design for detecting failure of the above portions of the device to perform their intended functions.

The diagram of Fig. 1 has been simplified to facilitate understanding and bring out the operative relationships between the various subcombinations. The circuit connections between the blocks are intended primarily to show the routing of the control signals. Ground leads have been eliminated and it will be assumed that means are provided for supplying appropriate anode and filament voltages to the vacuum tubes. Further, in the case of the blocks in Fig. 1, it will be understood that the circuits are disclosed from an operational standpoint and that circuit details may be added in a practical embodiment in accordance with established radio and electronic practice. Wave forms are represented at the significant points in the circuit as traveling waves to emphasize the continuous flow of intelligence from the data or input disk to the output or answer disk. The waves shown denote the addition of two six digit binary numbers as will be more fully covered in a later section.

STORAGE OF BINARY NUMBERS

For purposes of ready understanding of the system it will be assumed that the computer will be fed directly from binary storage devices, such intelligence having previously been recorded thereon by any desired means. In the practice of the invention each binary term is stored in the form of a magnetized area made up of successive spots of magnetism having unlike polarity and forming what may be termed a "magnetic couple." While it is possible to excite the computer by spots of magnetism on any movable magnetic element, it has been found advantageous to store the intelligence on rapidly rotating disks having a magnetizable periphery. Referring now to the block diagram of Fig. 1, magnetic storage disks 20 and 21 are shown mounted on a shaft 22 which is rotated by a driving motor 14. The disks are preferably constructed as shown in Fig. 2 with a continuous strip 24 of retentive finely divided magnetic material bonded firmly to the circular body. Alternatively, the disks may be made as disclosed at 20$^a$ in Fig. 2$a$. In the latter construction the magnetic elements 25$^a$ are separated and held in place about the periphery by non-magnetic spacers or teeth 26$^a$. In either embodiment, the disk body is preferably made of a non-magnetic material such as brass. In the case of the alternate embodiment, the elements 25$^a$ may be formed of sintered slugs of magnetizable material pressed into place or may be built up by spraying, using metal spraying apparatus commercially available. If desired, the slots containing the magnetic material may be undercut as shown in order to hold such material firmly in place under high-speed conditions.

The magnetic strip 24 may be magnetized by means of a recording head or armature 28 having a pair of coils 29, 30 mounted on a C-shaped magnetic core 22. During recording of data the two coils 29, 30 are preferably connected in the recording circuit in such a way that only one coil at a time will be energized. They are wound so that they tend to send flux in opposite directions around the magnetic circuit. Thus, as the disk 20 rotates and the strip 24 passes adjacent the pole faces, the magnetic material is subjected to a magnetizing force in one direction or the other depending upon which coil is energized. This results in spots of magnetism which are retained until it is desired to read them off.

In the case of the alternate embodiment, the recording head designated 28$^a$ is also C-shaped and is equipped with coils 29$^a$, 30$^a$, but since the head is differently oriented, the magnetic elements are magnetized in a direction parallel to the axis of rotation of the disk. In operation an adjacent pair of magnetic elements 25$^a$ is employed to represent one binary digit, the first magnet of the pair having one polarity and the second magnet having the opposite polarity. In a practical embodiment it has been found convenient to store four binary numbers on a disk at one time. Assuming that each of such numbers is composed of up to twenty-five digits, two hundred individual magnets per disk are sufficient.

In reading the previously recorded numbers off the disk a pick-up head may be used which is identical to the recording head 28 or 28$^a$, the coils being connected in series to increase the magnitude of the voltage generated. As the magnetic spots pass adjacent the pole faces, they set up a flux in the core generating a voltage in the coils which is proportional to the rate of change of this flux.

DERIVING AND SHAPING OF PULSE COUPLES

In order to excite the summing circuit to be later discussed, it is desirable that the signal obtained from the storage disks 20, 21 be formed into a square wave voltage composed of couples of plus and minus pulses of alternating polarity corresponding to the polarity of the magnets on the disk.

As a first step in obtaining the desired wave form, the voltage generated in the head 28 is integrated to obtain a voltage which is proportional to flux and which, at any instant, has a polarity which is representative of the polarity of the magnetic spot lying adjacent the pole faces at that instant. The integrator for accomplishing this is indicated generally at 32 in Fig. 1 and set forth in greater detail in Fig. 5. Referring to the latter figure it will be seen that the coil 29, 30 is connected to the grid of a vacuum tube 34 having a capacitor 35 in shunt with the plate circuit thereof. The output of the tube 34 appears at the plate terminal 36, the tube being supplied from any suitable high-voltage source through a load resistor 37. The capacitor 35 in conjunction with the tube resistance and load resistor 37 (which may be considered to be in parallel) serve as an RC integrator. The voltage across the capacitor is substantially the integral, with respect to time, of the voltage applied to the circuit, or in this case, the voltage generated in the pickup coils. Stated another way, the voltage is substantially proportional to flux in the disk. Since the pickup coils are not required to carry current, any inductance drop therein is substantially eliminated and a high order of accuracy is achieved.

As indicated at 38 (Fig. 1) the wave at the output lead 36 of the integrator consists of a series of direct and reversed cycles of substantially sinusoidal shape. For convenience in representation the wave 38 may be thought of as traveling, here to the right, into the succeeding stages. This convention will be adhered to in all other wave representations to which reference is made. Assuming that a minus-plus wave indicates the binary digit 0 and assuming that a plus-minus impulse corresponds to the binary digit 1, it will be seen that the wave 38 at the output of the integrator represents the binary number 000110, being the electrical equivalent to the number recorded magnetically on the disk 20.

Means are next provided for deriving a supplementary signal which is the inversion of the main control signal. Such inverted signal is fed along with the main signal but on a separate lead through the succeeding stages. In the present instance this is accomplished by a vacuum tube amplifier 39 which has a phase inverter stage to obtain push-pull output from a single input signal. Since such an amplifier may readily be constructed by one skilled in the art, it is not necessary to set forth the circuit in detail. Suffice it to say that the voltage wave existing at an output lead 40 will be the same as that existing at the input lead 36 except greater in magnitude while the voltage on a second output lead 41 is the inverted image thereof.

To convert the sine wave couples to square wave couples and to obtain a uniform properly synchronized voltage wave for all digits regardless of the magnitude of the signal obtained from the disk, a flip-flop device 42 having provision for periodic unlocking is employed. The circuit of the latter is set forth in Fig. 7 where it will be seen that it includes two triodes 44, 45 which may be included within the same envelope, if desired. Such triodes include cathodes 44$^a$, 45$^a$; grids 44$^b$, 45$^b$; and plates 44$^c$, 45$^c$, respectively. The circuit is arranged so that there are two stable conditions of operation: (a) with the grid 44$^b$ at zero potential and with grid 45$^b$ below cutoff, and (b) with the grid 45$^b$ at zero potential and grid 44$^b$ below cutoff. To this end the grids and plates are cross-connected by resistors 46, 48 and respectively grounded through grid resistors 49, 50 and bias source 53. The triodes are fed respectively through plate resistors 51, 52 from a high voltage source 54. The output of the flip-flop circuit is taken directly from the plates via output leads 55, 56.

When the first stable condition (a) exists, the triode 44 conducts and draws plate current from source 54 through resistor 51. This produces a voltage drop across the resistor 51 which decreases the potential of the output lead 55 relative to ground. Similarly, when the second condition (b) exists, triode 45 conducts to decrease the potential of the output lead 56 relative to ground. When the flip-flop circuit is in one of its stable conditions, it will remain in that condition due to the above-mentioned cross connection. Thus, if triode 45 is non-conducting, the potential of its plate will be high and due to its connection with the grid of triode 44 (through resistor 48) it will maintain the potential of that grid on the positive side of cut-off and cause the latter tube to conduct heavily. Conversely, if triode 45 is conducting, it will maintain the grid of triode 44 beyond cut-off for the full range of voltages on input lead 40. To cause the flip-flop circuit to remain locked in one condition, the output of the amplifier-inverter 39 is limited to a moderate level.

In order to enable the flip-flop circuit to be converted from one stable condition to another, means are provided for unlocking the tubes, i.e., for rendering both tubes momentarily non-conducting. This is preferably accomplished by connecting cathodes 44$^a$, 45$^a$, by a line 58, to a source generating positive pulses synchronized with the signals received at the input leads 40, 41. The means for generating such pulses will be referred to in detail at a later point. Suffice it to say that a positive pulse applied to the cathodes makes both tubes non-conducting, and when such voltage is removed the tube which starts conducting will be determined by the then existing voltage at the input terminals. The output voltage is independent of the input under normal locked conditions but may be considered to "aline itself" with the input voltage which obtains during the instant that the circuit is unlocked. It will be apparent to one skilled in the art that the present invention is not limited to the use of flip-flop circuits 42 having a pair of input leads and the circuit may be operated successively with one of the input leads eliminated. cessful with ine of the input condtions would The opposite grid under such conditions would receive its voltage only from the plate of the first tube.

Referring again to Fig. 1, it will be seen that the output signal from the flip-flop circuit 42 consists of a train of square waves 60 on lead 55 with their inverted counterparts 61 on lead 56. As stated above, all of the units in the block diagram have a common ground connection and it is therefore desirable that the signal voltage bear a predetermined relationship to ground potential. It is further desirable that the source be changed from high impedance to one of relatively low impedance for feeding into the summing portion of the device to be discussed. Accordingly, the dual signal is fed into a clamp and impedance changer 62, the circuit of which is set forth in detail in Fig. 8. This device includes a double diode 64, 65 and a double triode 66, 68. The diode circuits include input capacitors 69, 70 which are, in effect, shunted to ground through plate resistors 71, 72. It will be apparent, therefore, that the diode circuits serve as conventional clamping devices, maintaining the positive portions of the input signals at a positive potential determined by battery 73. The triodes 66, 68 are excited by the outputs of the clamping circuits and include cathode resistors 74, 75 across which the output is taken on leads 76, 78. The latter tubes thus serve as conventional cathode followers. As a result of the clamping, the output waves 79, 80 of the device 62 have substantially the same envelope as the input signal but bear a definite relationship to ground potential.

In the above discussion only a single input channel has been discussed, namely, that leading from the disk 20. In order to obtain a sum it is, of course, necessary to have a second channel which is substantially the equivalent but which carries intelligence corresponding to a second number. The second channel will be found in Fig. 1 directly below that previously discussed and corresponding primed reference numerals have been employed to indicate that the components are equivalent. Square output waves 79', 80' are also obtained for feeding into the summing circuit.

Included within the first channel is a reversing switch 81 which, as will later appear, is employed in subtraction and which for present purposes may be disregarded.

DIGIT ADDER CIRCUIT

The apparatus thus far described has been for the purpose of obtaining reliable and accurately phased square wave couples representative of a binary number. The purpose of the digit adder circuit indicated generally at 82 (Fig. 1) is to utilize such voltage couples to produce a sequence of couples on each of two output leads, one sequence representing the answer of the summation, and the other sequence representing a series of carry digits. The adder portion of the apparatus to be discussed utilizes three input voltages and their inverted counterparts, the first two of such voltages being supplied from the channels controlled by the disks 20, 21. It will be found convenient to designate the main output wave of the first channel as A, its inversion as A' and the output of the second channel as B having an inversion B'.

In practicing the invention three alternative circuits are provided as set forth in Figs. 10, 11 and 12 to act upon two simultaneously received input couples in a predetermined manner which satisfies the requirements of binary addition as the same is carried out order by order. Thus, if one of the input signals represents a binary 1, and the other 0, the summing circuit should write 1 and nothing should be carried over to the next higher order. If both of the inputs A (and its inversion A') and B (with its inversion B') carry a couple representative of a binary digit 1 the summing circuit should write a 0 and carry a 1.

In order to insert a carry signal from the previously summed order, a third input C having an inversion C' is employed. The couple fed to the summing circuit at C, C' is supplied from a novel delay circuit to which more detailed reference will later be made. Suffice it to say that the carry signal always arrives at the input of the summing circuit just one order or cycle delayed or "late." Thus all three of inputs A, A'; B, B'; and C, C' may at any instant be carrying a couple corresponding to a binary 0 or a binary 1. It will be apparent, then, that when all three inputs are a binary 1, both outputs should be a binary 1.

By this point in the discussion it will be clear that the function of the adder circuits, for example that shown in Fig. 10, is to respond to the coincidence of voltages on the input leads. In the latter figure it will be seen that the six input leads may be divided into two sets of three corresponding to the direct and inverted signals and grouped respectively A, B, C, and A', B', C'. The output leads include a write lead 84 and a carry lead 85. It will be understood that the word "write" is used in a broad sense to indicate that the output signal on lead 84 is recorded as part of the sum. Preferably such recording is accomplished magnetically as will later appear. The actual printing of the information is not specifically covered in the present application.

The adder circuit as disclosed in Fig. 10 includes six valves in the form of triodes, adjacent ones of which are included within the same glass envelope. Such triodes are designated by the numerals 86-91. The cathodes, grids and plates of each of the triodes carry the corresponding numeral with the respective subscript $a$, $b$, or $c$. Referring in greater detail to the input portion of the adder circuit 82 it will be seen that the leads A', B', C' are all conneced to the control grid of the tube 87 through grid resistors 92, 93, 94. Similarly, the input leads A, B, C, are connected to the grids of the triodes 88, 89 through grid resistors 95, 96, 97 and 98, 99, 100. Each of the triodes 87—89 includes a source of bias comprising a grid resistor and grid battery which have been designated respectively by the numerals 101, 102; 103, 104; and 105, 106. The plates of the triodes 87—89 are connected to a source of high voltage 108 via dropping resistors 109, 110, 111. Because of the grid connections and the plate dropping resistors, the voltages existing at the plate terminals 112, 113, 114 swing through relatively wide limits determined by the signal voltages existing at the input. The tubes 87—89 may thus be conveniently referred to as "primary" control or input tubes.

In accordance with one of the aspects of the invention, the plate potentials of the primary control tubes existing at terminals 112, 113, 114 are applied through grid resistors to the grid $90^b$ of a "secondary" control tube 90. Such resistors are designated 115, 116, 117 respectively. The grid $90^b$ is further connected to a source of bias including a resistor 118 and a battery or the like 119. On the plate side, a dropping resistor 124 permits the plate terminal voltage to swing over relatively wide limits.

Through the action of the circuit thus far discussed, the voltages existing at the input leads are employed in combination to control the conductivity of the primary control tubes 87—89 while the resulting states of conductivity act jointly to control the conductivity in the secondary control tube 90 and the voltage at its output terminal 125. As shown in Fig. 10, the primary control tube 87 serves to control the conductivity in a carry output tube designated at 86 while the secondary control tube 90 controls the conductivity in a write output tube 91. The state of conductivity of such output tubes in turn determines the instantaneous potential on the write and carry output leads. Completing the circuit, it will be noted that the output tubes have associated grid resistors 122, 123 and cathode resistors 120, 121 respectively, causing the stages to function as low impedance cathode followers.

In practicing the invention the bias on the grid of the primary control tube 87 is of such a value that it maintains the grid of triode 87 below cut-off unless two or more of the three leads A', B', C' are positive. Since the inverse voltages appear at the input leads A, B, C, this is equivalent to saying that the triode 87 is maintained beyond cut-off unless one or none of the leads A, B, C are positive. In order that the effect of such bias condition may be ascertained at a glance, the following Table I has been prepared, listing the grid voltages and approximate plate voltages on all of the control tubes under the various combinations of input voltage at the input leads A, B, C.

positive at the beginning of a digit space. It is apparent that this fulfills one of the conditions of binary addition, namely, a binary 1 must be "written" only when the total of the numbers added is 1 or 3.

At first glance it might appear that the volt-

Table I

| Number of leads A, B, C, which are positive | 87 Grid | 87 Plate | 88 Grid | 88 Plate | 89 Grid | 89 Plate | 90 Grid | 90 Plate | Write | Carry |
|---|---|---|---|---|---|---|---|---|---|---|
| 0 | Z | 10 | C | 105 | C | 105 | Z | 10 | minus | minus. |
| 1 | Z | 10 | Z | 10 | C | 105 | C | 105 | plus | Do. |
| 2 | C | 105 | Z | 10 | C | 105 | Z | 10 | minus | plus. |
| 3 | C | 105 | Z | 10 | Z | 10 | C | 105 | plus | Do. |

Z=Zero. C=Cut-off.

For purposes of convenience Z has been used to designate the fact that a particular grid is at zero potential (corresponding to flow of plate current) while C has been employed to designate the fact that a given grid is biased beyond cut-off thereby to prevent the flow of plate current. In a practical circuit using conventional receiving-type triodes it has been found that a plate swing of from 10 to 105 volts is readily obtained between the conducting and non-conducting conditions respectively. These values have accordingly been used in the table as representative.

In utilizing Table I it will be seen in the case of primary control triode 87 that the grid bias is zero and the plate voltage correspondingly low with none or one of the leads A, B, C positive; while the triode is cut-off and the plate voltage correspondingly high when either two or three of the leads A, B, C are positive.

Turning attention now to the control triode 88, the bias derived from the source 104 is so adjusted that a positive voltage at any one of the leads A, B, C, is sufficient to cause the tube to conduct. When none of the leads A, B, C is positive, such tube is non-conducting and the plate terminal voltage is correspondingly high.

In the case of the primary control triode 89 the voltage of the associated grid battery 106 is of such value that all three of the leads A, B, C must be positive for conduction to take place. With less than three leads positive the tube is non-conducting and the plate voltage is high.

The function of the secondary control tube 90 differs from that of the control tubes previously discussed in that the grid 90b is controlled not by the input voltages directly but by the state of conductivity of the primary control tubes. To obtain the desired output signal the triode 90 has its bias set by the battery 119 so that the tube is cut-off until two of the three leads supplying the grid network become appreciably positive. This is equivalent to saying that the secondary control tube 90 is cut-off unless at least two of the primary control triodes are cut-off and, therefore, non-conducting. From inspection of the table, it is apparent that the secondary control triode will conduct only when none of the input leads A, B, C are positive or when two of such leads are positive. Under conditions in which either one or three of the leads A, B, C are positive, the triode 90 is biased to cut-off and, therefore, non-conducting. The write output tube 91 is arranged to apply a positive voltage to the write output lead 84 only when the secondary control tube 90 is non-conducting. Thus a write 1 signal will exist at the output lead 84 only under two conditions: When one of the leads A, B, C is positive or when three of the leads A, B, C are positive at the beginning of a digit space. It is apparent that this fulfills one of the conditions of binary addition, namely, a binary 1 must be "written" only when the total of the numbers added is 1 or 3.

At first glance it might appear that the voltages on the input leads would have very little individual effect due to the paralleling of the grid resistors 92—94, 95—97, and 98—100 respectively. It has been found as a practical matter that the arrangement shown causes the grid voltage to exist in desired well-defined steps and circuit complications encountered in any attempt to add the input voltages serially are avoided.

Referring now to the carry output tube 86 (at the left-hand portion of Fig. 10) it will be seen that a positive voltage will be applied to the carry output lead 85 only when the primary control tube 87 is cut off. As will be apparent from the first column of the table a positive signal is produced at the carry output lead only when two or three of the input leads A, B, C are positive. Thus a carry 1 signal will be obtained only when two or three of the input leads A, B, C are positive for the first half of the cycle. This fulfills the second requirement for binary addition, namely, carrying (to the next highest order) whenever the binary sum exceeds 1. In short, the circuit of Fig. 10 satisfies the requirements for sequential binary addition except for delaying the carry signal until the next highest order is being summed.

DELAY CIRCUIT

In the preceding section it has been assumed that the appropriate carry signal derived from the summation in a previous order has been appropriately delayed so that it may be added to the signals existing at the A, A', and B, B' input leads. It has further been assumed that the carry signal appearing at the carry output lead 85 is suitably delayed to appear at the leads C, C' upon summing the signals corresponding to the binary digits of the next higher order. In accordance with the present invention, novel means are provided between the output lead 85 and the input lead C, C' for delaying the signal over a space of time corresponding to one couple, in other words, for one summing cycle. This is accomplished by providing a series of flip-flop circuits which are successively unlocked by pulses generated in accurately timed synchronization with respect to the stored data. As employed in the preferred embodiment illustrated in Fig. 1 the flip-flop circuits are of the same type previously discussed in connection with circuits 42 and 42' and set forth in detail in Fig. 7. It will be recalled that a positive pulse applied to the cathodes serves to unlock the circuit thereby enabling it to respond to the then existing voltage at its input terminals.

Prior to being fed through the flip-flop devices the signal on the carry lead 85 is inverted by means of a phase inverter 130. The specific circuit as set forth in Fig. 9 will be seen to be of more or less conventional design including a pair of triodes 131, 132 having cathodes, grids and plates carrying corresponding subscripts a, b, c. The grid 131$^b$ of the triode 131 is excited directly from the line 85 to produce a corresponding output signal on an output lead 134. The grid of the triode 132 is oppositely excited by a diagonally-connected resistor 135 and series capacitor 136 leading to the plate of the first triode. It will be apparent to one skilled in the art that a positive voltage applied to the grid of the first triode 131 will cause a corresponding negative voltage to be applied to the grid of the second triode 132. As a result the voltage appearing at the second output lead 138 will be opposite in phasing to the voltage appearing at the output lead 134 as shown by the typical waves 139, 140.

From this point the carry signal passes through four serially arranged flip-flop circuits 141, 142, 143, 144. Those circuits are, in general, unlocked individually and in regularly recurring sequence to pass the information "down the line" one step at a time. Preferably the flip-flop devices are arranged in two alternating groups 141, 143 and 142, 144 and unlocking pulses are fed to the groups alternately. In the present instance the pulses are supplied to flip-flop circuits 141, 143 through an unlocking lead 145 and are supplied to flip-flop devices 142, 144 through an unlocking pulse lead 146 at a rate of two pulses per cycle. Such pulses are furthermore timed with the data fed into the summing circuit to insure that a complete unlocking cycle occurs which is synchronized with successive cycles of data. Specifically, at the start of a cycle comprising one wave or couple, the flip-flop circuits 142, 144 are first unlocked. This feeds into the summing circuit the carry signal from the previous summation. One-quarter of a cycle later the flip-flop circuits 141, 143 are unlocked so that 141 may respond to the then existing output of the summing circuit. In a similar fashion the flip-flop circuits 142 and 143 are unlocked at the middle and three-quarter points of the cycle respectively. At the start of the next cycle, the signal then existing at the output of the flip-flop circuit 144 is applied to the input leads C, C', such signals corresponding exactly to the carry signal which appeared at the carry lead 85 just one cycle before.

From the foregoing it is seen that the four serially connected flip-flop circuits 141-144 are unlocked successively at quarter cycle intervals to provide a complete cycle or digit space delay for the carry signal. In addition, the specific delay arrangement enables a maximum amount of reliability since it operates substantially independently of the wave form and in spite of relatively wide variations in the amplitude of the wave. In this connection note that the first flip-flop circuit, which is the most critical since it determines the signal to be passed along by the remainder of the flip-flop circuits, is unlocked at the first and third quarter points of a couple. These points are approximately centered within the regions of maximum amplitude. Thus, if the magnitude of the wave should decrease for any reason, positive response of the first flip-flop circuit is still assured. Operation is likewise reliable in spite of considerable inaccuracy in the phasing of the data signal and in spite of sloping or rounding off of the wave front. In short, the circuits are kept synchronized by the unlocking pulses so that construction of the computer as a whole is not unduly critical.

Inserted in the line between the flip-flop circuit 144 and the C, C' input terminals of the summing circuit are a switch 148 and a clamp and impedance changer 149. The latter is in all respects similar to the clamp and impedance changer 62, 62' previously discussed in detail in connection with Fig. 8. The output waves of the latter are designated 147, 153. As to the switch 148, this may be assumed to remain closed and may be disregarded for the present, serving a function which will later be discussed in detail. In summarizing, it will be apparent that the circuit loop starting at lead 85 and ending at leads C, C' serves to transport a carry signal from one order to the next, and may be thought of as a feed-back circuit with a single cycle (or digit) delay.

GENERATION OF UNLOCKING PULSES

Reference will next be made to the preferred means for applying pulses to the leads 145, 146 for unlocking flip-flop circuits 141—144. To insure synchronism the unlocking pulses preferably originate in a pulsing disk 150 which is shown in the upper left-hand corner of Fig. 1 and mounted on the shaft 22 which drives the storage disks 20, 21 previously referred to. As shown in Fig. 3, the disk 150 has on its periphery a plurality of closely spaced teeth 151 which cooperate with a pickup coil 152 having a core 154. The core preferably has a chisel-shaped tip which extends within a short distance (about .005 inch) of the crests of the teeth 151. A direct current is passed through the coil 152 and as the teeth on the rotating disk pass beneath the core, the reluctance of the magnetic circuit is changed, inducing an alternating voltage 153 in the coil which is then peaked, inverted, and amplified. The device for accomplishing the latter is termed the dual pulse generator 155, the preferred circuit being disclosed in detail in Fig. 4 to which reference is now made.

As shown, the pulse generator includes a pair of cascaded amplifying tubes 156, 158, the signal from the pickup coil 152 being conveyed to the grid of the first tube through a capacitor 159. The amplified signal from the tube 158 is then passed through the primary of a saturable transformer 160 having a center tapped secondary 161. Due to saturation a voltage is obtained at each side of the center tap which is very peaked. Such voltages, oppositely phased, are separately amplified by amplifiers indicated at 163, 164 respectively. The latter serve to excite respective cathode follower stages 165, 166 which supply the output leads 145, 146 previously referred to. For purposes of clarity the peaked unlocking waves on the leads 145, 146 are shown in Fig. 1 as 168, 169, the pulses occurring at the rate of two on each line per cycle. While each of the lines 145, 146 carries only two unlocking pulses per cycle, it is to be noted that the pulses supplied on one line alternate with those in the other so that a total of four unlocking pulses per cycle are supplied to the delay channel as a whole.

Since the pulsing disk 150 is rigidly coupled for rotation with the data disks 20 and 21, the unlocking pulses will be in step with the data signals. The angular relationship between the data disks 20, 21 and the pulsing disk 150 is not depended upon, however, for exact synchronization between the data signals and the unlocking of the delay circuit. On the contrary it will be noted that the data flip-flop devices 42, 42' are unlocked by the same set of pulse leads which unlock the delay circuit, being connected thereto by lines 58, 58' (Fig. 1). As a result synchronization is positive and the assembling of the disks on the shaft 22 need not be a high precision operation. To insure that the delayed carry signal is fed into the summing circuit in step with the incoming data, still another precaution is taken. This has to do with the timing of the unlocking pulses in the delay circuit relative to the wave form of the signal being acted upon. As pointed out above, the unlocking pulses are applied to the first flip-flop circuit 141 near the center of each half of the input wave or couple. Since the wave is substantially rectangular, it will be apparent that considerable departure on one side or the other of the center point may be tolerated without causing misphasing difficulties.

While the preferred circuit includes four serial flip-flop devices unlocked with four pulses per cycle, it will be appreciated by one skilled in the art that a greater number could be used if desired without departing from the present teachings, always keeping in mind that the number of unlocking pulses should be sufficient to cause a delay of exactly one cycle or digit space.

RECORDING OF WRITE SIGNAL

As previously stated, the signal appearing on the write lead 84 consists of a succession of couples of the same general wave form as those applied at the input of the summing circuit, the wave form being shown at 170 (Fig. 1) for purposes of convenience. The signal is then preferably passed through a phase inverter 171 appearing in both the direct and inverted form at leads 172, 174. At this point an alarm circuit may be employed to which detailed reference will later be made. The direct and inverted waves 182, 184 are next amplified by any suitable amplifier 176. The output of the amplifier is then passed through the coils of a recorder head at 177 to record the sum magnetically on an output disk 180. The latter is preferably of the same type as the storage disks 20, 21 and is synchronized therewith by mounting on the same shaft 22. The recorder head may likewise be of the same type discussed in detail in connection with Fig. 2. The individual coils 29, 30 thereof being supplied through the leads 178, 179. The recorded data corresponding to the binary sum of the binary numbers appearing on the disks 20, 21 may then be read off of the disk 180 by any suitable pickup head (not shown). When the adder is employed as part of a more complete computer capable of multiplying and the like, additional numbers may be continuously recorded on the disks 20, 21 and their sums only temporarily stored on the disk 180. The present device is thus seen to be eminently well suited for continuous high speed operation.

While it is true that the signals 182, 184 to be "written" are square waves, it has been observed that the resulting magnetism impressed on the disk 180 is more nearly sinusoidal. This is believed due to the fact that a certain amount of neutralization or averaging of the flux takes place on the disk at the boundaries between the fluxes of opposite sign. In any event the signal subsequently picked up from the output disk 180 as the answer is "read" will be found to be substantially of the same wave form as that "read" from the input disks 20, 21.

SUMMARY OF OPERATION AND WAVE FORMS

While the complete computer contains additional meritorious features requiring discussion, it will be found convenient to review the operation of the components thus far discussed in order to show more clearly the manner in which the information picked up from the storage disks 20, 21 is recorded as a binary sum on the output disks 180. Turning to Fig. 10a, the wave forms of the signal as they exist at a number of significant points in the circuit are shown and may be conveniently grouped as follows:

Pulse output #1 from dual pulse generator 155
Pulse output #2 from dual pulse generator 155
Signal from first storage disk 20
Signal from first storage disk after squaring and clamping (lead A to summing circuit)
Signal from second storage disk 21
Signal from second storage disk after squaring and clamping (lead B to summing circuit)
Delayed carry signal after clamping (lead C to summing circuit)
Plate voltage of triode 87 (carry signal before delay)
Plate voltage of triode 88
Plate voltage of triode 89
Plate voltage of triode 90 (write signal as applied to recording coil)

All of the waves have been vertically alined with respect to a common time axis so that it is possible to trace the effect of digit couples fed into the circuit from the storage disks 20, 21 from beginning to end. Since the waves may be considered as "flowing" progressively to the right, the first digit space or order is along the right-hand edge of Fig. 10a and has been designated a. The couples corresponding to digits in the next highest order operated upon in the computer occupy a space b. Successive orders have been designated as c, d, e, and f. Individual couples are denoted by a corresponding subscript.

The over-all operation of the computer may be understood by observing what occurs during solution of a practical problem: the addition of 000110 to 000011 previously recorded and stored on disks 20, 21. Both of these numbers together with their sum, 001001, are placed in Fig. 10a immediately below the couples which represent them. As a first step the first (lowest order) digit read off of the storage disk 20 is 0 (zero). The couple corresponding to this first digit signal has been designated 38ᵃ in Fig. 10a, and after shaping and clamping produces a square minus-plus couple 79ᵃ which is fed into the summing circuit on lead A. The lowest order digit of the second binary number is 1 (one) and appears in magnetic form on the second storage disk 21. The electrical couple corresponding thereto is designated 38'ᵃ, which after shaping and clamping appears as the plus-minus couple 79'ₐ on lead B.

It will be assumed that the carry signal C is 0, the first couple of the carry signal being minus-plus and indicated at 147ᵃ.

Under the above conditions the only one of the signals A, B, C having an initial positive portion is B. The resulting voltages appearing at the plates of the triodes 87—90 may be determined merely upon inspection of the previously discussed Table I. These voltage waves are represented in the drawing as 126—129 with the first or leading couples designated 126ᵃ—129ᵃ. Turning attention to the voltage 129ᵃ (triode 90) it is seen that the voltage is high during the initial portion of the first cycle and low during the final portion. This causes a similar variation at the cathode of the cathode follower triode 91. The latter results in a plus-minus couple leading the wave on the write output lead 84 which is amplified and recorded as a 1 (one) on the output disk 180.

The carry signal is dependent upon the output voltage of triode 87. Since the sum for the first order (as seen above) is 1, the carry signal is 0 (zero) as represented by the minus-plus couple 126ᵃ. Because of the delay circuit this carry signal is carried over into the next order b as the minus-plus couple 147ᵇ on input lead C.

Having observed the sequence of operations in the first order a, attention is next directed to the second column from the right in Fig. 10a which shows the operation of the computer during the second order b. In the second order the digit on each of the storage disks 20, 21 is 1 (one). This results in the application of the plus-minus pulses 79ᵇ and 79'ᵇ to the summing input leads A and B respectively. The voltage variation at the plate of tube 90 constitutes a minus-plus couple 129ᵇ which is fed at low impedance to the write lead 84. 0 is thereupon written magnetically on the output disk 180. The voltage variation at the plate of tube 87 on the other hand during this cycle is a plus-minus couple 126ᵇ. This corresponds to carrying a binary 1 to the next order. After delay it will be seen that this carry signal is fed into the summing circuit at C in the next higher order c. The above process is repeated for the orders c, d, e and f resulting in the writing of digits 0, 1, 0 and 0 on the disk 180 to complete the answer, namely, 001001.

While a six digit binary problem has been taken as representative, a practical computer employing the present teachings is not so limited. Computers may be readily constructed with a capacity of 25 or more binal places which takes care of the great majority of problems arising in business. When using a machine of larger capacity for a relatively simple problem such as that outlined above, the higher orders on the disks 20, 21 should be completely occupied by zeros and corresponding zeros will thus be written in the higher orders of the answer on disk 180.

LOW ORDER DIGIT INSERTER FOR CARRY CIRCUIT

In the above discussion it has been assumed that the initial information fed from the carry delay circuit represented a binary digit 0 so that, in effect, there was nothing carried in summing the digits of the first order. If the computer were used to perform but a single problem of addition, this would in general be true. However, since the computer is normally called upon to perform a large number of problems of addition in quick succession, the addition of the first digits of a given pair of numbers follows directly after the addition of the last digits of the preceding number. It is, therefore, quite possible that the carry for the first digits added might not always be zero as it should to obtain the correct answer. In accordance with one of the aspects of the invention, therefore, means are included in the carry circuit for disabling the carry circuit during the addition of the first digit and inserting a zero signal (minus-plus couple) in the carry input leads C, C'. Preferably this is accomplished by a simple switching arrangement which causes a minus-plus couple to be applied during the summation of digits in the first orders and the carry signal to be applied normally during the remainder of the number.

Prior to a discussion of the manner in which the initial zero signal is inserted in the carry leads it will be helpful to refer to that portion of the apparatus used for generating the inserted zero. As disclosed in Fig. 1 a zero generating disk 200 is employed which is mounted on shaft 22 and is rotated in synchronism with the storage gears 20, 21. The disk 200 is constructed substantially the same as disk 150 except that the pitch of the teeth on disk 200 is twice the pitch of the teeth on disk 150. A direct current is passed through the pick-up coil 200 which is similar to coil 152. As the reluctance of the magnetic circuit is changed by the movement of the teeth past the tip of the core, an alternating voltage representative of a series of binary 0's is produced as indicated at 201. This signal is then amplified in a vacuum tube amplifier 202 which is conventional in design.

Next, the wave is shaped and inverted by passing it through a flip-flop device 204 having output leads 205, 206 and an unlocking lead 204. Such flip-flop device is equivalent to the devices 42, 42' and shown in detail in Fig. 7. The shaped output signal 209 and its inversion 210 are next fed through a reversing switch 211 having output leads 216, 217. The reversing switch may be passed over for the present since it is not normally employed in the process of simple addition. Subsequently the signal passes through a double pole single throw switch 215 which is identical to the single throw switch 148 previously referred to and which is contained at the output of the carry delay circuit. It will be apparent that with the switch 148 closed and with the switch 215 open, zeros from the zero generating disk 200 will be blocked off and the circuit will operate in the manner previously described. However, with the reverse condition existing, that is, with the switch 148 in the carry delay circuit open and with the switch 215 from the zero generating disk 200 closed a constant stream of couples representative of binary 0's will be fed into the input leads C, C' of the summing circuit. But as pointed out above, it is desirable that a zero be fed into the carry input leads C, C' only during the first cycle or digit space.

Accordingly, means are provided for operating the switch 215 in such a manner that the switch is closed only during the first digit space of a summation. In the present instance this is accomplished by a switch control disk 220 having teeth or equivalent magnetic irregularities 221 at spaced intervals about the periphery thereof and corresponding in positioning to the beginning of the binary numbers on the storage disks 20, 21. A pick-up head 223 cooperates with the disk 220 to detect such irregularities and may be of the same type as shown at 152 in Fig. 3. The head thus produces pulses 222 which are fed into an amplifier 225 of conventional design to produce direct and inverted output waves having initial peaks synchronized with the initial or lowest order digits of the two binary numbers fed from the storage disks 20, 21. The amplifier output is used to excite a flip-flop device 226 having output leads 228, 229 and of the same general type previously discussed in connection with Fig. 7. The unlocking pulses for the device 226 are obtained from an auxiliary disk 230 having magnetic irregularities thereon and fitted with a cooperating pick-up head just as in the case of disk 220. To steepen and amplify the wave front, the pulses are fed through a peaking amplifier 231 of a type well known to those skilled in the art before being applied to the pulse lead 224 of the flip-flop circuit. As shown, disks 220, 230 preferably carry the peripheral teeth in groups of two with the first producing a control pulse at the very beginning and the second producing a control pulse near the end of the first binary digit space. The first pulses are effective to change the flip-flop device 226 to its alternate or switched condition and the other to restore it to its normal condition. The output of the flip-flop device is then applied to the switches 148 and 215 so that 215 conducts only during the first digit space and 148 conducts only during the remainder of the spaces comprising a binary number.

While a number of different switch circuits may be used to perform the above-outlined function without departing from the invention, the preferred form of electronic switch is disclosed in detail in Fig. 13. The circuit includes four triodes 250, 251, 252, 253, having cathodes, grids, and plates bearing corresponding reference numerals with the subscript $a$, $b$, or $c$ respectively. In the plate circuits of the triodes 251, 253 are included plate dropping resistors 255, 256 respectively. The cathodes are connected together in pairs and are grounded through cathode resistors 258, 259. Referring to the left-hand portion of the circuit, it can be seen that if the grid 252$^b$ has a relatively large potential applied to it, current will flow through a circuit including the cathode resistor 259, cathode 252$^a$ and plate 252$^c$ thus producing a relatively large voltage drop across the cathode resistor. This raises the cathode potential sufficiently to bias the triode 253 to cut-off for all values of voltage normally applied to the input lead 216. Thus normal variations in the signal voltage applied to the input lead 216 cannot affect the current through plate resistor 256 and the potential at plate 253$^c$ thus remains fixed.

If now the voltage applied to the grid 252$^b$ by the control lead 229 is materially reduced, the current drawn by the triode 252 is also materially reduced. The effect of the latter is to lower the potential of the cathode 253$^a$ to the point where voltage swings applied to the grid 253$^b$ by the input lead 216 will cause corresponding variations in the plate current. These plate current variations will result in a varying voltage drop across the plate resistor 256 and the input signal will be reproduced at the output lead 219. Inherent in the latter operation is a 180° phase reversal. The latter may, however, be readily compensated for merely by interchanging the two output leads 218, 219, such cross connection being set forth in the circuit shown in Fig. 13. From the foregoing it is evident that with a negative potential applied to the pulse lead 229 the switch is effectively closed, that is, the output voltage corresponds to the then existing value of the input voltage. Conversely, with a relatively high positive voltage on the pulse lead 229 the switch is blocked and no signals are permitted to pass through.

While only the left-hand portion of the circuit disclosed in Fig. 13 has been described in detail, it will be appreciated by one skilled in the art that the right-hand portion operates in exactly the same manner. In short, the input signal at lead 217 produces a corresponding output signal at lead 218.

As a result of the action of the flip-flop control circuit 226 acting on the double pole single throw switches 215, 148, the switch 215 is exclusively closed only during the first digit space, allowing one of the zero digit signals from the disk 200 to be applied to the carry input leads C, C' of the summing circuit. During the remainder of the digit spaces switch 215 is open and the carry delay circuit operates through switch 148 to apply a carry signal to the summing circuit as has been previously described. The summing of a given pair of binary numbers thus takes place independently of the sums taken immediately before or after.

SUBTRACTION

Subtraction is accomplished in a manner quite similar to addition. The primary difference is that instead of adding the first number to the second, the complement of the first number is added to the second number. Broadly this complement is obtained by inverting the signal of the subtrahend in order to reverse the sense of all of the couples which make up the number to be subtracted. In the present instance such reversal has been accomplished in the channel leading from the storage disk 20 by inclusion of the reversing switch 81. In its simplest aspect this switch may be a simple manually operated double-pole double-throw toggle switch. Or, as will be apparent to one skilled in the art, an electromagnetic reversing switch or even an electronic reversing switch of conventional design may be used. Where the computer disclosed herein is to be used as a larger and more complete calculating device, an electronic switch automatically controlled by a pulsed control line is preferred. Such an arrangement is disclosed in applicant's copending application Ser. No. 76,088 filed February 12, 1949.

The effect of operating the reversing switch in the present circuit is to substitute at the input terminals A, A' of the summing circuit 1's for 0's and 0's for 1's. This gives the complement with respect to 111 . . . 11 or the largest number that the machine will hold. Actually, in order to obtain a correct result it is necessary to use the complement with respect to a number 1 greater than the capacity of the machine or 1000 . . . 00. The true complement is obtained in the practice of the present invention by adding 1 to the complement formed by inverting the signal. In accordance with the present invention this 1 is obtained from the same channel (associated with the zero generating disk 200) which is used to insert the initial 0 in the carry input leads C, C'. This is accomplished in the present instance by inserting the reversing switch 211 in such channel preferably between the flip-flop circuit 204 and the zero control switch 215. The reversing switch 211 is of the double-pole double-throw type and may be identical with the reversing switch 81 in the A, A' leads and to which reference has previously been made. The reversing switch will cause an initial 1 rather than an initial 0 to be inserted in the carry leads when the summing circuit 82 operates upon the first binary order. This in effect makes the complement 1 greater than it otherwise would be thus producing a true complement and causing the true difference to be "written" on the output disk 180.

ALTERNATIVE DIGIT ADDER CIRCUIT USING MULTIGRID TUBES

As previously covered, an adder circuit is disclosed in Fig. 10 which produces a carry signal at its output when either two or three of the input leads A, B, C are positive and which further produces a write signal when either one or three of the input leads are positive. It will be apparent to one skilled in the art that the invention is by no means limited to the specific circuit of Fig. 10 but includes alternative and equivalent circuits utilizing the same basic teachings. One such alternative scheme has been set forth in Fig. 11 with the input and output leads labeled just as in Fig. 10.

This circuit also employs cascaded control tubes biased in accordance with the voltages appearing at the leads A, B, C and A', B', C'. The primary difference between the circuit of Fig. 11 and that in Fig. 10 previously discussed is that multigrid tubes rather than triodes are employed. Such tubes may be conventional receiving-type pentodes having control, screen, and suppressor grids.

Referring in greater detail to Fig. 11 it will be seen that it includes primary control tubes 240—246 inclusive and secondary control tubes 250, 251. Just as in the previous embodiment the secondary control tubes include control elements responsive to the plate current flow in the primary control tubes. In the case of each of the tubes the electrodes progressing outwardly from the cathode toward the plate may be designated by the subscripts $a$–$e$ inclusive.

To begin with it will be helpful to observe the manner in which a carry signal is applied at the output lead 85 when two or more of the input leads A, B, C are positive. In the practice of the invention the three input leads A, B, C are distributed among the primary control tubes 240, 241, 242 such that each of such tubes is controlled by two of the input leads. In each instance the suppressor grid is connected directly to the cathode. Thus, tube 240 is controlled by lines B, C, 241 by lines A, C, and 242 by lines A, B. Bias is derived from a battery or the like 252 which is shunted by a bias adjusting potentiometer 254. The bias is adjusted so that both the control and screen grids in any one tube must be made positive before such tube passes plate current. With only one of the control electrodes positive the tube remains cut off. In order that the carry output lead 85 may be responsive to the state of conductivity of any one of the tubes 240, 241, 242, the cathode potential of the tubes is caused to swing through a relatively wide range. This is effected by means of a cathode resistor 255 which is common to all of the above-mentioned tubes. In effect, therefore, the tubes 240, 241, 242 constitute a cathode follower responsive to certain combinations of input voltages.

To prevent the control tubes from drawing grid current, grid resistors 256 are placed in series with the control grid in each instance. As a result it has been found that the control grids are never driven appreciably above cathode potential. If all three of the input leads A, B, C are made positive with respect to ground (corresponding to an input of three binary 1's) all three of the tubes are conductive. However, the cathode resistor 255 preferably has a value such that when one tube is conducting the voltage drop across the tube is small as compared to the voltage drop across the resistor 255. Thus, the voltage drop across the resistor and the voltage of output lead 85 will be substantially the same whether one, two or three tubes are conducting. It is clear, then, that this portion of the circuit fully meets the condition that a positive output signal be produced when either two or three of the input leads A, B, C are positive.

Attention will next be given to the right-hand portion of Fig. 11 which applies a positive voltage to the write output lead 84 when either one or three of the input leads A, B, C are positive. It will be noted that the remaining primary control tubes are paired, the cathodes of tubes 243, 244 and 245, 246 being respectively connected together. The control electrodes of tubes 243 are connected to leads C, B' while those of tube 244 are connected to B, C'. The cathodes are connected to a cathode resistor 258 which enables the cathode output lead 259 to swing with respect to ground. With the circuit connected as shown it will be apparent that the cathode output lead 259 will swing positively only when C, B' or B, C' are positive. In terms of B and C alone, an output signal will be produced at the lead 259 when either B or C are positive but not when both are positive.

Reference may next be made to the secondary tube 250 having its screen 250$^c$ connected to the output of tubes 243, 244. The control grid 250$^b$ is connected to the input terminal A'. The tube 250, similar to the other tubes in the present embodiment, is connected as a cathode follower having a cathode resistor 260. The write output lead 84 is connected directly to the cathode of this stage. Here again it is necessary for both grids to be positive for plate current to flow. That is to say, it is necessary for A' to be positive and for either B or C (but not both) to be positive. The latter condition, it will be recalled, is due to the conductivity conditions set up for tubes 243, 244. In summary, therefore, conduction will take place in the secondary output tube 250 producing a positive output signal on the write lead 84 when the following conditions are met:

A-minus
B-plus
C-minus or

A-minus
B-minus
C-plus

In order to satisfy the remaining requirements, additional primary control tubes 245, 246 are used feeding into secondary control tube 251. In the case of tube 245 the grids are controlled by input lines B', C' while the grids of tube 246 are connected to the input leads B, C. These tubes have a common cathode resistor 261 and are likewise biased so that both of the grids must be positive to produce conduction. The cathodes are jointly connected to an output lead 262. A positive signal is applied to the latter output lead only when B and C are both positive or both negative, and under such conditions a positive voltage is applied to the screen grid 251$^c$ of the tube 251. The control grid 251$^b$ on the other hand is connected directly to input line A. The cathode of this tube is directly connected to the write output lead 84 which shares the cathode resistor 260. It will be apparent from the foregoing that the tube 251 conducts to produce a positive write signal when A is positive and when B and C are both positive or both negative. The two conditions of conductivity may be summarized as follows:

A-plus
    B-minus
    C-minus
or
    A-plus
    B-plus
    C-plus

Adding these two conditions to the two conditions previously set forth in connection with the secondary output tube 250 we see that a write signal is produced when either a single one of the input leads A, B, C is positive or when all three are positive. In terms of function, a binary 1 is "written" when either one or three binary 1's appear at the input.

In order that the parallel between the circuit described immediately above and that previously discussed may be more clearly drawn, a table of over-all operating characteristics may be set up which corresponds generally to Table I as follows:

ly, at the cathodes of tubes 243, 244 and 245, 246 and at the write and carry output leads 84, 85. The pulse and data signals derived from the data disks and shown in Fig. 10a apply here equally and consequently need not be repeated. In both circuits the signal at the write output lead 84 consists of couples representative of the binary number 001001.

ALTERNATIVE DIGIT ADDER CIRCUIT USING DIODE RECTIFIERS

In accordance with one of the more detailed aspects of the invention another alternative adder circuit using unidirectional electronic devices is the form of diodes instead of grid controlled rectifiers is disclosed in Fig. 12. The wave forms applicable to the circuit of Fig. 12 are to be found in Fig. 12a.

Just as in the case of the previous two summing circuits (Figs. 10 and 11) input leads A, B, C are provided on which are respectively received couples corresponding to first and second data signals together with a carry signal all representative of binary digits. The inverse or comple-

*Table II*

| Leads, positive | Tube 240 (B-C) | Tube 241 (A-C) | Tube 242 (A-B) | Tube 243 (C-B') | Tube 244 (C'-B) | Tube 245 (C'-B') | Tube 246 (C-B) | Tube 250 (A-243, 244) | Tube 251 (A-245, 246) | Write Output | Carry Output |
|---|---|---|---|---|---|---|---|---|---|---|---|
| None | C | C | C | C | C | Z | C | C | C | minus | minus. |
| A | C | C | C | C | C | Z | C | C | Z | plus | Do. |
| B | C | C | C | C | Z | O | C | C | C | ...do... | Do. |
| C | C | C | C | Z | O | C | O | C | C | ...do... | Do. |
| A-B | C | C | Z | O | Z | O | O | C | C | minus | plus. |
| A-C | C | Z | C | Z | C | O | O | C | C | ...do... | Do. |
| B-C | Z | C | C | C | C | O | Z | C | C | ...do... | Do. |
| A-B-C | Z | Z | Z | C | C | C | Z | C | Z | plus | Do. |

C—Cut-off. Z—Conducting.

The letters in parenthesis directly under the tube numbers for tubes 243—246 indicate the leads which supply the grids of that particular tube. The characters directly under tubes 250 and 251 indicate that the input lead A' or A must be a plus voltage and, in addition, certain tubes as indicated must be conducting. It will be seen that the signals on the write and carry leads as listed at the right-hand portion of the table correspond exactly to the conditions listed in Table I.

The alternative scheme of Fig. 11 is merely representative of the various forms the circuit may take without departing from my basic teachings. If desired, a portion of the tubes may be of the multigrid variety while the remainder may be simple triodes. For example the tubes in the left-hand portion of Fig. 11 indicated at 240, 241, 242 may be replaced by a pair of triodes connected as shown at 86, 87 in Fig. 10. In the latter event it will, of course, not be necessary to connect the plate terminal to the resistor 115 shown in the latter figure. Nor is the invention limited to the use of tubes having two control grids since it will be obvious to one skilled in the art that the teachings are applicable to tubes other than receiving type tetrodes. One important factor is that there be a bank of tubes employed as primary control tubes and excited directly from the input lines together with a bank of secondary control tubes which are controlled in accordance with the state of conductivity of the primary control tubes. Also a significant feature common to the circuits of Figs. 10 and 11 is the use of the inverted as well as the direct input signal for controlling the primary control tubes.

Fig. 11a shows the voltages existing at four significant points in the circuit of Fig. 11, namementary signals are, as before, received on the respective primed input leads designated A', B', C'. The output leads of the circuit of Fig. 12 comprise a write lead 84 and a carry lead 85. Combinations of the instantaneous potentials on the six input leads are effective, through the disclosed circuit, to produce a desired voltage condition on the write lead when one or three of the leads A, B, C are positive and to produce the desired condition on the carry lead only when two or three of the leads A, B, C are positive.

Referring to the circuit of Fig. 12 for accomplishing the above it will be seen that two banks of rectifiers are employed. The first bank 351 consists of what may be termed "primary" rectifiers connected in groups of three to terminals 352 to 358 inclusive. These rectifiers are connected in the various possible combinations to the input leads A, B, C and A', B', C'. For purposes of convenience each has been designated by a reference numeral corresponding to the terminal and line to which it is connected. For example, the first rectifier is designated 352A to indicate that it is connected between the terminal 352 and the line A.

Each of the terminals 352–358 inclusive is grounded through a resistor, such resistors being designated 362 to 368 inclusive. The magnitude of the resistance is preferably high as compared to the forward resistance of the rectifiers. The rectifiers themselves may consist of crystals of germanium commercially designated 1N34. If desired, however, such rectifiers may be formed of other materials having a backward resistance which is high as compared to the forward resistance and may even consist of vacuum tube rectifiers such as one-half of a type 6H6 vacuum tube The operation of the circuit thus far described will be made clear by considering what occurs in the group of rectifiers at the left-hand portion of Fig. 12 under various conditions of applied line voltage. It will be noted that the rectifiers are respectively connected to input lines A, B' and C'. If any of these lines should at any given instant be positive, current will flow through its associated rectifier, through the series resistor 362, to ground. Since the series resistor is of relatively high resistance, the output terminal 352 of the rectifiers during current flow will assume a potential which is substantially equal to the positive line potential. If, on the other hand, the instantaneous value of the voltages on the lines A, B', C' are all negative, then no current will flow through any of the rectifiers and the rectifier output terminal 352 will be substantially at ground potential. Thus, in the case of the first group of rectifiers the condition which must be met in order to have terminal 352 near ground potential is to have a negative voltage on line A and positive voltages on lines B and C.

The remainder of the rectifier groups and the associated resistors operate in the same manner except that they are connected to different combinations of the six input terminals. Just as in the case of the first group of rectifiers, a certain combination of voltages on the input leads will cause the output terminal to be near ground potential. It will be seen that there is only one condition of the input lines which will cause each of the terminals 352—358 to be near ground potential. Such conditions are summarized in the following table:

*Table III*

| Terminal | Voltage Condition of Lines A, B, C, to Cause Terminal to be Near Ground Potential | | | Number of Input Leads A, B, C, Which Are Positive |
|---|---|---|---|---|
| | A | B | C | |
| 352 | 0 | + | + | 2 |
| 353 | + | 0 | + | 2 |
| 354 | + | + | 0 | 2 |
| 355 | + | + | + | 3 |
| 356 | + | 0 | 0 | 1 |
| 357 | 0 | + | 0 | 1 |
| 358 | 0 | 0 | + | 1 |

In the practice of the invention the output voltages of the rectifiers obtained at terminals 352—358 are divided for feeding into circuits associated with the write output lead 84 and the carry output lead 85. Such division is accomplished in a manner such that a predetermined output voltage exists on the write lead 84 when either one or three of the input leads A, B, C are positive and further, so that a predetermined output voltage exists on the carry lead 85 when either two or three of the input leads A, B, C are positive. From the above table, it will be apparent that to satisfy this condition terminals 352—354 should be associated in one group and terminals 356—358 formed into a second group. Terminal 355, which is near ground potential when the leads A, B, C are all positive, is included with each of the groups since this condition requires both writing and carrying.

In order that predetermined voltage conditions at the terminals 352—358 may cause a signal to appear on the appropriate output line and in order to isolate the output lines against undesired voltage conditions, an additional bank of "secondary" rectifiers is used. Thus terminals 352—355 are connected to the carry output lead 85 through rectifiers 372—375 and terminals 355—358 are connected to the write lead 84 through rectifiers 376—379. So that the voltage on the carry output lead 85 might swing between predetermined limits, the line is connected to a source of potential 384 through a series resistor 385. Correspondingly, the output lead 84 is connected to the source of potential 384 through a series resistor 386. In operation, the existence of a positive potential at one of the rectifier terminals, for example terminal 352, causes a flow of current to ground through the associated resistor, here 362. Since the resistance of the series resistor 362 is high, the terminal 352 assumes a positive potential substantially that of the positive line to which it is connected. With the terminal 352 positive there is no effect whatsoever on the associated output lead since the rectifier 372 is so polarized as to perform an isolating function.

Preferably, the resistors 385, 386 are of a high resistance as compared to the resistors 362—368. For example, in a practical embodiment the resistors 385, 386 may be approximately one megohm while the resistors 362—368 are on the order of 100,000 ohms. The voltage of the potential source 384 is so adjusted that with all of the terminals 352—358 positive, no current will flow through the resistors 385, 386. Under such circumstances the voltage existing at the output leads 84, 85 will be substantially the same as that of the potential source 384.

The voltage on the output leads changes markedly, however, when one of the associated rectifier terminals, for example terminal 352, is reduced to substantially ground potential. The latter can be clearly seen by noting the path of current flow with terminal 352 at ground potential. The circuit under such circumstances includes the potential source 384, the series resistor 385, the rectifier 372, and the resistor 362. Due to the fact that the resistor 385 is large as compared to the resistor 362, most of the voltage drop will occur across the resistor 385 thereby reducing the potential on the output lead 85 substantially to ground potential. The potential on the lead 85 is reduced to near ground potential in exactly the same manner whenever the potential at any one of the terminals 353—355 is correspondingly reduced. In short, the voltage on the carry output lead 85 is reduced to substantially ground potential whenever two or three of the input leads A, B, C are positive. This condition, occurring during the first half of a digit space in the present circuit, causes a binary 1 to be inserted in the summation of the next higher order. The right-hand portion of the circuit operates in similar fashion: Whenever any one of the terminals 355—358 is reduced to ground potential, the voltage at the output lead 84 is reduced to substantially ground potential. When this condition obtains during the first half of a digit space, a write 1 signal is produced at the output lead 84.

Comparing this circuit to the other two alternative circuits disclosed in Figs. 10 and 11 it will be noted that the voltages produced at the output leads 84, 85 are just the reverse of those previously obtained. That is to say, zero output voltages are obtained on the write and carry leads for conditions which produced positive voltages in the previous circuits. This state of affairs, however, is readily compensated for merely by interchanging the direct and reverse output leads of a subsequent stage, for example, the output leads of the phase inverters 171 and 130 (Fig. 1) respectively associated with the leads 84, 85.

In order that the operation of the circuit of Fig. 12 may be understood more completely, the wave forms of the signals existing at various significant points in the circuit have been set forth in Fig. 12a. As in the previous representations of wave form, the waves shown in Fig. 12a are assumed to be travelling waves progressing to the right. The digit spaces from the lowest order to the highest have been set off by vertical lines and have been designated a to f inclusive. The last two of the waves designated 390 and 391 represent the write signal and the carry signal on the lines 84, 85 respectively. As pointed out above, the polarity of the latter signals is just the reverse of that shown in Figs. 10a and 11a. Upon simple inversion, the intelligence carried by the write signal is seen to be 001001 showing clearly that the same answer is written regardless of the particular one of the summing circuits which may be employed.

Not only is the result the same under a given set of input voltage conditions but the circuit itself is similar in a number of respects to the two others (Figs. 10, 11) previously discussed. Each uses rectifiers which may be referred to as "unidirectional electronic devices" or valves. Thus, the first circuit uses vacuum tubes with single control grids, the second uses vacuum tubes with multiple grids, and the third employs crystal diodes. In all the circuits there is a set of input valves responsive to the coincidence of input voltages and a set of output valves with the former serving in predetermined combinations to control the instantaneous condition of conductivity, and thus the output, of the latter. Also, in all three embodiments illustrated the input is arranged to be controlled jointly by both direct and inverted input leads which greatly simplifies the circuit and increases reliability of operation. As will be recognized by one skilled in the art, the circuits, despite their similarity, have individual advantageous features which will dictate which of the circuits should be employed. The embodiment using crystal diodes, for example, has the advantage of extreme compactness and long life.

COMPARING AND ALARM CIRCUITS

It is clear from the foregoing description that throughout the present computer each binary digit is represented by a couple, the couple consisting of plus-minus or minus-plus voltages depending upon whether the binary digit is a 1 or 0. In accordance with one of the aspects of the invention, the reversal of polarity taking place for each binary digit is utilized in a novel manner to make certain that the system is performing the computation accurately. To do this the signal resulting from the computation and appearing, for example, on the write leads 172, 174 is passed through a comparing and alarm circuit 300. This circuit includes provision for checking to insure that the second half of each digit couple of the answer is the complement or reversal of the first half of the digit couple. Upon failure of practically any element in the circuit, the two halves of the digit couple will not be complementary but will be of the same polarity. The circuit is arranged so that the latter condition causes an alarm to sound and the computer may then be stopped until the trouble is located and corrected. The circuit for accomplishing the above is disclosed in block form in Fig. 1 to which reference is made. The signal from write leads 172, 174 representing the answer is fed into two channels, one consisting of two serially arranged flip-flop devices 301, 303 and the second consisting of a single flip-flop device 302. Each of the latter is of the same type previously discussed in connection with Fig. 7 and each is supplied with an unlocking pulse from an alarm pulsing disk 305 and a dual pulse generator 306. The pulse generator is generally of the same type as that shown in Fig. 4 and previously described except that only one pulse per digit space rather than two is obtained from the disk 305. As a result a sharp pulse is produced on output lead 310 at the beginning of each digit space and on the second output lead 311 at the middle of each digit space.

The pulsing lead 310 is connected to the flip-flop device 301 so that the latter assumes a condition representative of the condition of polarity on the leads 172, 174 during the first portion of a digit space. The flip-flop device 303 on the other hand is pulsed at the middle of a digit space and consequently assumes a condition of polarity which is determined by the polarity of the output leads of the flip-flop device 301.

It will be noted that the flip-flop device 302 is likewise connected to the pulse lead 311 and is thus unlocked at the middle of a digit space. Stated another way, the flip-flop device 303 is temporarily locked into a condition representative of the first half of the digit couple and the flip-flop device 302 is simultaneously locked into a condition representative of the second half of the digit couple. If the digit is properly represented, the coexisting outputs of these two flip-flop devices should be complementary. If they are the same, it is desirable to operate an alarm to call this error to the attention of the operator. The latter is preferably accomplished by a comparing and alarm circuit 312 set forth in detail in Fig. 6.

The preferred circuit for sounding an alarm when the outputs of the flip-flop devices 302, 303 are non-complementary, includes a pair of double grid vacuum tubes 320, 321 (Fig. 6). The elements of the tubes may be designated with corresponding reference numerals with the subscripts $a$, $b$, $c$, or $d$ progressing outwardly from the cathode. For purposes of convenience the input lines have been designated 324, 325, 326, 327. As shown, the control grids of the tube 320 are controlled by lines 324, 326 from the flip-flop devices 302, 303 while the control grids of the tube 321 are controlled by the remaining input lines. The characteristics of the tubes are such that both of the grids must be made substantially positive for conduction to take place from a suitable plate voltage source 333. Since the cathodes of the two control tubes are connected in parallel and grounded through a cathode resistor 330, the cathode terminal 331 will swing positive whenever conduction occurs in at least one of the tubes.

In the preferred form of the invention the positive swing of terminal 331 is applied to the grid of a grid controlled gaseous rectifier or thyratron 332. As is characteristic of the latter type of tube, exceeding a predetermined grid voltage causes breakdown between the cathode and plate; and the resulting flow of current is employed to actuate an electromagnetic relay 334. Contacts 335 associated therewith close the circuit of any desired type of alarm device 336. Resetting is accomplished by means of a resetting switch 338 which is effective to momentarily open the plate circuit and thus cause conduction to cease, restoring control to the thyratron grid.

During normal operation the potential existing at the input lead 324 will normally be the opposite of that existing at the lead 326. Likewise the potential on the input lead 325 will be the opposite from that existing on the remaining input lead 327. Accordingly, during normal operation, the grids in neither one of the control tubes 320, 321 will be positive at the same time and conduction will not take place. However, should the couple existing on the answer leads 172, 174 be defective and not have first and second portions which are complementary, then the potentials existing on the leads 324, 326 will be both positive or both negative. If they are both positive conduction will take place in the tube 320, while if they are both negative, then the potentials on the leads 325, 327 will necessarily be both positive and conduction will take place in tube 321. In either event an alarm is sounded.

While checking the couples at the output constitutes an adequate guarantee of accuracy, it will be apparent that additional alarms may be employed to monitor other circuits carrying binary couples in exactly the same manner. For example, the input leads of the flip-flop devices 301 and 302 could be connected to the input leads A, A', B, B' or C, C' of the summing circuit.

PRACTICAL DESIGN CONSIDERATIONS

With the above description in mind it is readily possible for one skilled in the art to construct a practical computer. While certain design details have been alluded to above, it will be helpful to summarize the features which have been included in a workable embodiment. A convenient speed of rotation for the shaft 22 has been found to be 1800 R. P. M. Four binary numbers are recorded on a single data disk four inches in diameter, each number having 25 digit spaces allotted thereto. Since it takes $\frac{1}{20}$ of a second for the shaft to rotate through one-quarter of a revolution, and since the circuit performs the process of addition in step with the reading of the data from the data disks, only $\frac{1}{20}$ of a second is required for the addition of two 25-digit binary numbers. To take full advantage of this speed all that is necessary is to provide any desired means including additional heads for constantly recording fresh data on the data disks 20, 21 and for reading off the answers as they appear on the output disk 180. An exemplary arrangement for accomplishing the latter is shown in my copending applications Serial No. 76,088 filed February 12, 1949 and Serial No. 157,369 filed April 21, 1950. Erasure is not required since the recording of data in magnetic form completely obliterates any previous data existing thereon. In the case of numbers less than 25 digits in length, the remaining places of higher order are filled with binary zeros.

With regard to tube types it has been found that any vacuum tube having the appropriate number of elements is sufficiently fast, and the choice may thus be based on considerations of power, amplification factor and physical size. For example, I prefer to use type 6SN7 as a basic double triode and the 6SL7 as an amplifier in view of its higher amplification factor. The double grid tubes may be of the type 6SJ7. In order to produce sufficient output power prior to recording, the recording amplifier includes type 6V6 output tubes. Corresponding types of miniature and sub-miniature tubes may be employed if desired for maximum compactness. Using the principle outlined herein it is possible to construct a computer capable of addition and subtraction of binary numbers using only about 60 tubes which is but a small fraction of those normally thought to be necessary for handling 25-digit numbers. It is also noteworthy that numbers even several times larger may be handled without increasing the tube complement by as much as one tube, the only change being in the size of the data disks. Thus it is seen that the capacity of the computer may be readily varied by the mere substitution of mechanical elements and without modification of the electrical circuits.

I claim as my invention:

1. In a digital computer for summing a pair of numbers the combination comprising first and second magnetic storage devices each having means including a member movable relatively thereto for reading stored numbers and converting them into respective trains of successive voltage impulses, a digit adding circuit having its input connected for response to said trains of voltage impulses and having in addition write and carry output leads, means including a magnetic recording device having a member movable relatively thereto for storing a number representative of the sum of said pair of numbers in accordance with voltage impulses produced at said write output lead, a carry delay circuit responsive to the voltages at said carry output lead for feeding into the input of said digit adding circuit a train of delayed voltage impulses representative of a succession of digits respectively carried from one order to the next higher order, means including a magnetic synchronizing device having a member movable relative thereto for unlocking said carry delay circuit, all of said relatively movable members being coupled for movement in unison so that each order of the sum is synchronously recorded immediately after the summation of the digits of corresponding order.

2. In a digital computer for summing a pair of numbers the combination comprising first and second data storage devices each having means including a movable member for reading numbers stored therein and converting them into respective trains of successive voltage impulses, means for positively driving the movable members with the latter coupled together, a digit adding circuit having three input leads, two of which are connected for response to said trains of voltage impulses and having write and carry output leads, means for recording a number representative of the sum of said pair of numbers in accordance with voltage impulses produced at said write lead, a carry delay circuit responsive to the voltages at said carry output lead for feeding into the third input lead of said digit adding circuit a train of delayed voltage impulses representative of a succession of digits respectively carried from one order to the next higher order, synchronizing devices inserted in the input leads of said digit adding circuit, and means coupled to said driving means for simultaneously unlocking said synchronizing devices to insure that voltage impulses of corresponding order are applied to said digit adding circuit in exact synchronism.

3. In a digital computer for summing a pair of numbers the combination comprising first and second data storage devices each having means including a relatively movable member for reading stored numbers and converting them into respective trains of successive voltage impulses in which the binary digits 1 and 0 are represented by a plus-minus and minus-plus voltage couples, a digit adding circuit having three input leads, two of which are connected for response to said trains of voltage impulses and having in addition write and carry output leads, means including a relatively movable member for recording a number representative of the sum of said pair of numbers in accordance with voltage impulses produced at said write lead, a carry delay circuit responsive to the voltages at said carry output lead for feeding into the third input lead of said digit adding circuit a train of delayed voltage impulses representative of a succession of digits respectively carried from one order to the next higher order, synchronizing devices inserted in the input circuits of said digit adding circuit for controlling the time of admission of the voltage impulses, and pulsing means including a movable member for simultaneously unlocking said synchronizing devices, all of said movable members being coupled for movement in unison.

4. In a computer as a subcombination a digit adder comprising three input leads, a write output lead, and a carry output lead, said input leads being connectable to a source of potential capable of applying a voltage impulse to all or part of said input leads corresponding to binary digits, means including a plurality of input vacuum tubes having their grids controlled by said input leads, write and carry output circuits including vacuum tubes having their grids rsepectively directly coupled to the plate circuits of said input vacuum tubes and having their plates respectively connected to energize said write and carry output leads, said vacuum tubes being so connected that a voltage impulse on one or three of said input leads causes an impulse of predetermined polarity to appear on said write lead while an impulse on at least two of said input leads causes an impulse of said polarity to appear on said carry lead.

5. In a computer as a subcombination a digit adder circuit comprising three direct input leads, and three inverted input leads, said input leads being connectible to a source of control potential capable of applying a predetermined voltage to all or part of said direct input leads and capable of applying an opposite voltage simultaneously to corresponding ones of said inverted input leads, said voltages being representative of binary digits, means including a first bank of unidirectional electronic devices controlled by said input leads, write and carry output circuits including a second bank of unidirectional electronic devices arranged for control by said first bank of unidirectional electronic devices and connected to energize said write and carry leads, said unidirectional electronic devices being so connected that application of said predetermined voltage to one or three of said direct input leads causes an output voltage to appear on said write lead while application of said predetermined voltage to at least two of said input leads causes an output voltage to appear on said carry lead.

6. In a summing circuit for use in a computer employing the binary system of numbers, the combination comprising three direct input leads adapted for carrying voltage signals of a polarity representative of a first data digit, a second data digit and a carry digit respectively: three inverted input leads adapted for carrying voltage signals which are the respective inversions of the signals on the direct input leads; a write output lead and a carry output lead; first primary control tube means, one set of said input leads being connected to the input circuit of said first primary control tube means, the latter being biased to a point requiring two of said leads to be positive for conduction to take place; means associating the plate circuit of said primary control tube means with said carry lead so that said carry lead has impressed thereon a voltage representative of a carry digit when at least two of said direct input leads are positive, said input leads being further connected to the input circuits of additional primary control tube means, and secondary control tube means having an input circuit controlled jointly by the potentials existing in the plate circuit of at least a portion of said primary control tubes, the plate circuit of said secondary control tube means being associated with said write lead, and said secondary tube means being so biased and arranged that a voltage representative of a write digit is impressed upon said write lead when either one or three of said direct input leads are positive.

7. In a binary computer the combination comprising data sources supplying first and second data signals each, said signals consisting of a voltage train made up of a series of voltage impulses varying either positively or negatively from a mean reference value to represent a series of binary digits. means for operating on such signals to produce along with said data signals additional signals which are the respective inversions thereof, and a summing circuit having input valves therein, said input valves being connected to respond not only to said data signals but to said inverted signals as well, and means including output valves in said summing circuit and connected for direct control by said input valves to produce at the output terminals of the summing circuit a train of voltage impulses indicative of the sum of simultaneously received trains of voltage impulses representing said data signals.

8. In a binary computer the combination comprising data sources supplying first and second data signals, said signals each consisting of a train of plus-minus and minus-plus voltage couples to represent a series of binary digits, means for operating on such signals to produce along with said data signals additional signals which are the respective inversions thereof, and a summing circuit having input tubes therein, said input tubes being connected to respond not only to said data signals but to said inverted signals as well, and means including output tubes in said summing circuit and directly coupled to said input tubes to produce at the output terminals of the summing circuit a train of voltage impulses consisting of voltage couples indicative of the sum of the simultaneously received train of couples representing said data signals.

9. In a high speed digital computer the combination comprising a computing circuit for receiving problem data in the form of a series of voltage impulses and for acting upon such data in a predetermined manner to produce a series of voltage impulses representative of the answer to a problem, first and second devices for storing problem data and each including a circular disk having at its outer edge a series of peripherally spaced areas of retentive magnetic material polarized to represent said data and including an electromagnetic armature having poles for cooperation with said magnetic areas successively upon rotation of said member, means for feeding the data to said computing circuit, and means including a synchronizing disk drivingly coupled to said storage disks for producing sharp pulses for triggering the feeding means to insure that the data is fed into said computing circuit in exact synchronism.

10. In a computer for performing addition of two binary numbers order by order, a delay device for delaying a digit signal one digit interval in order to carry the digit represented thereby from one order to the next higher order comprising, in combination, means including a data source for producing couples consisting of rectangular first and second half waves of opposite polarity with the order of the polarities denoting which of the two binary digits is represented, four serially connected flip-flop circuits each having output terminals which correspond in polarity to the input terminals upon receipt of an unlocking pulse the first one of said flip-flop circuits being supplied by said data source, and means for supplying unlocking pulses to the first and third of said serially connected flip-flop circuits at the center portion of each of said half waves while supplying unlocking pulses to the second and fourth flip-flop circuits at a quarter-wave interval thereafter, the rectangular nature of the wave enabling accurate response of said first flip-flop circuit in spite of discrepancies of synchronization between the waves and the unlocking pulses.

11. In a digit adder circuit for use in a computer employing the binary system of numbers, the combination comprising three direct input leads adapted for carrying voltage signals of a polarity representative of a first data digit, a second data digit and a carry digit respectively; three inverted input leads adapted for carrying voltage signals which are the respective inversions of the signals on the direct input leads; a write output lead and a carry output lead; a first primary control tube, said inverted input leads being connected to the input circuit of said first primary control tube for joint control thereby, the latter being biased to a point requiring two of said leads to be positive for conduction to take place, the plate circuit of the tube being associated with said carry lead so that said carry lead has impressed thereon a voltage representative of a carry digit when at least two of said direct input leads are positive; second and third primary control tubes, said direct input leads being connected to the input circuits of said second and third primary control tubes for joint control thereby, the latter being biased to points respectively requiring one and three of said direct input leads to be positive for conduction to take place; and means including a secondary control tube having its input circuit controlled jointly by the potentials existing at the plate terminals of said primary control tubes and biased to a point requiring at least two of said terminals to be highly positive for conduction to take place, the plate circuit of said secondary control tube being associated with said write lead so that a voltage representative of a write digit is impressed upon said write lead when either one or three of said direct input leads are positive.

12. In a digit adder circuit for use in a computer employing the binary system of numbers, the combination comprising three direct input leads adapted for carrying voltage signals of a polarity representative of a first data digit, a second data digit and a carry digit respectively; three inverted input leads adapted for carrying voltage signals which are the respective inversions of the signals on the direct input leads; a write output lead and a carry output lead; means including a first primary control tube, said inverted input leads being associated with the input circuit of said first primary control tube for joint control thereby, the latter being biased to a point requiring two of said leads to be positive for conduction to take place, the plate circuit of the tube being associated with said carry lead so that said carry lead has impressed thereon a voltage representative of a carry digit when at least two of said direct input leads are positive; second and third primary control tubes, said direct input leads being associated with the input circuits of said second and third primary control tubes for joint control thereby, the latter being biased to points respectively requiring one and three of said direct input leads to be positive for conduction to take place; and means including a secondary control tube having its input circuit controlled jointly by potentials existing in the respective plate circuits of said primary control tubes and biased to a point requiring at least two of said plate circuits to be highly positive for conduction to take place, the plate circuit of said secondary control tube being associated with said write lead so that a voltage representative of a write digit is impressed upon said write lead when either one or three of said direct input leads are positive.

13. In a digit adder circuit for use in a computer employing the binary system of numbers, the combination comprising a set of three direct input leads, each being arranged to supply a series of plus-minus and minus-plus voltage couples representative of binary digits; a set of three inverted input leads arranged to supply voltage couples which are the respective inversions of the couples on the direct input leads; a write output lead and a carry output lead; a first primary control tube, one set of said input leads being connected to the input circuit of said first primary control tube for joint control thereby, the latter being biased to a point requiring two of said leads to be positive for conduction to take place, the plate circuit of the tube being associated with said carry lead so that said carry lead has impressed thereon a voltage couple representative of a binary 1 when at least two of said direct input leads carry a binary 1 couple; second and third primary control tubes, the other set of input leads being connected to the input circuits of said second and third primary control tubes for joint control thereby, the latter being biased to points respectively requiring one and three of said direct input leads to be positive for conduction to take place; and means including a secondary control tube having its input circuit controlled jointly by the potentials existing at the plate terminals of said primary control tubes and biased to a point requiring at least two of said terminals to be highly positive for conduction to take place, the plate circuit of said secondary control tube being associated with said write lead so that a voltage couple representative of a binary 1 is impressed upon said write lead when either one or three of said direct input leads carry binary 1 voltage couples.

14. In a digit adder circuit for use in a computer employing the binary system of numbers, the combination comprising three direct input leads adapted for carrying voltage signals of a polarity representative of a first data digit, a second data digit, and a carry digit; three inverted input leads adapted for carrying signals which are the respective inversions of the signals on the direct input leads; a write output lead and a carry output lead; a first bank of primary control tubes having two control grids therein connected to paired combinations of said direct input leads, the plate circuit of the tubes being associated with said carry lead so that a voltage is impressed thereon representative of a carry digit when at least two of said direct input leads are positive; a second bank of primary control tubes having two control grids therein, said control grids being connected to paired combinations of the first and second of said direct input leads and the corresponding inverted input leads; a bank of secondary control tubes each having two control grids, one of the control grids in each tube being associated with the plate circuits of said second bank of primary control tubes, said secondary control tubes having the remaining control grid therein associated with the third one of said direct input leads and the third one of said inverted input leads respectively, the plate circuits of said secondary control tubes being associated with said write lead so that a voltage representative of a write digit is impressed upon said write lead when one or three of said direct input leads is positive.

15. In a digit adder circuit for use in a computer employing the binary system of numbers, the combination comprising three direct input leads adapted for carrying voltage signals of a polarity representative of a first data digit, a second data digit, and a carry digit; three inverted input leads adapted for carrying signals which are the respective inversions of the signals on the direct input leads; a write output lead and a carry output lead; means associated with at least a portion of said input leads and said carry output lead for impressing a voltage on the latter representative of a carry digit when at least two of said direct input leads are positive; two pairs of primary control tubes each having two control grids therein, said control grids being connected to paired combinations of the first and second of said direct input leads and the corresponding inverted input leads; a pair of secondary control tubes each having two control grids, one of the control grids in each tube being respectively associated with the plate circuits of said pairs of primary control tubes, said secondary control tubes having the remaining control grid therein associated with the third one of said direct input leads and the third one of said inverted input leads respectively, the plate circuits of said secondary control tubes being associated with said write leads so that a voltage representative of a write digit is impressed upon said write lead when one or three of said direct input leads is positive.

16. In a digit adder circuit for use in a computer employing the binary system of numbers, the combination comprising a set of three direct input leads, each being arranged to supply a series of plus-minus and minus-plus voltage couples representative of binary digits; a set of three inverted input leads arranged to supply voltage couples which are the respective inversions of the couples on the direct input leads; a write output lead and a carry output lead; a first bank of primary control tubes having two control grids therein connected to paired combinations of said direct input leads, the plate circuit of said tubes being associated with said carry lead so that a voltage couple is impressed thereon representative of a binary 1 when at least two of said direct input leads carry a binary 1 couple; a second bank of primary control tubes each having two control grids therein, said control grids being connected to paired combinations of the first and second of said direct input leads and the corresponding inverted input leads; a bank of secondary control tubes each having two control grids, one of the control grids in each tube being associated with the plate circuits of said second bank of primary control tubes, said secondary control tubes having the remaining control grid therein associated with the third one of said direct input leads and the third one of said inverted input leads respectively, the plate circuits of said secondary control tubes being associated with said write lead so that a voltage couple representative of a binary 1 is impressed upon said write lead when one or three of said direct input leads carry binary 1 voltage couples.

17. In a digit adder circuit for use in a computer employing the binary system of numbers, the combination comprising three direct input leads adapted for carrying voltage signals of a polarity representative of a first data digit, a second data digit, and a carry digit respectively; three inverted input leads adapted for carrying signals which are the respective inversions of the signals on the direct input leads; a write output lead and a carry output lead; a first bank of rectifiers connected in groups of three to the various possible combinations of the three direct and three inverted input leads, each group of three rectifiers having an associated output terminal which is grounded through a grounding resistor so that individual ones of said output terminals exist at substantially ground potential only when none of the input leads associated therewith are positive, a bank of secondary rectifiers, said secondary rectifiers being arranged to connect a portion of said terminals to said carry output lead and another portion to said write lead, auxiliary sources of potential having a high resistance included in series therewith, said write and carry output leads being respectively connected to said auxiliary sources of potential and said secondary bank of rectifiers being so polarized that a voltage representative of a carry digit is impressed upon said carry output lead when two or more of said direct input leads are positive and so that a voltage representative of a write digit is impressed upon said write output lead when either one or three of said direct input leads are positive.

18. In a digit adder circuit for use in a computer employing the binary system of numbers, the combination comprising three direct input leads A, B, C adapted for carrying voltage signals of a polarity representative of a first data digit, a second data digit, and a carry digit respectively; three inverted input leads A', B', C' adapted for carrying inverted voltage signals which are the respective inversions of the voltage of the signals on the direct input leads; a write output lead and a carry output lead; rectifiers connected in groups of three to said input leads in the following combinations:

AB'C'
A'BC'
A'B'C
A'B'C'
ABC'
AB'C
A'BC said groups each having a common terminal, grounding resistors for said rectifiers and connected to said terminals so that said terminals exist near ground potential only when the voltages on the leads associated therewith are all negative, a source of positive potential connected to said write lead and said carry lead and including separate high resistances in series therewith, a secondary bank of rectifiers having a first portion thereof interconnecting said carry output lead and the terminals associated with the following combination of input leads:

AB'C'
A'BC'
A'B'C
A'B'C' and a second portion interconnecting said write output lead and the terminals associated with the following combination of input leads:

A'B'C'
ABC'
AB'C
A'BC said secondary rectifiers being so polarized that a relatively negative voltage is impressed upon the carry output lead when at least two of said direct input leads are positive and so that a relatively negative voltage is impressed upon said write ouput lead when either one or three of said direct input leads is positive.

19. In a digit adder circuit for use in a computer employing the binary system of numbers, the combination comprising three direct input leads A, B, C adapted for carrying voltage signals of a polarity representative of a first data digit, a second data digit and a carry digit respectively; three inverted input leads A', B', C' adapted for carrying inverted voltage signals which are the respective inversions of the voltage of the signals on the direct input leads; a write output lead and a carry output lead; rectifiers connected in groups of three to said input leads in the following combinations:

AB'C'
A'BC'
A'B'C
A'B'C'
ABC'
AB'C
A'BC said groups each having a common terminal, grounding resistors for said rectifiers and connected to said terminals so that said terminals exist near ground potential only when the voltages on the leads associated therewith are all negative, a source of positive potential connected to said write lead and said carry lead and including separate high resistances in series therewith, a secondary bank of rectifiers having a first portion thereof interconnecting said carry output lead and the terminals associated with the following combination of input leads:

AB'C'
A'BC'
A'B'C
A'B'C' and a second portion interconnecting said write output lead and the terminals associated with the following combination of input leads:

A'B'C'
ABC'
AB'C
A'BC said secondary rectifiers being so polarized that a relatively negative voltage is impressed upon the carry output lead when at least two of said direct input leads are positive and so that a relatively negative voltage is impressed upon said write output lead when either one or three of said direct input leads is positive, and means for inverting the voltages on the write and carry output leads.

20. In a digit adder circuit for use in a computer employing the binary system of numbers, the combination comprising a set of three direct input leads each being arranged to supply a series of plus-minus and minus-plus voltage couples representative of binary digits; a set of three inverted input leads arranged to supply voltage couples which are the respective inversions of the couples on the direct input leads; a write output lead and a carry output lead; a first bank of rectifiers connected in groups of three to the various possible combinations of the three direct and three inverted input leads, each group of three rectifiers having an associated output terminal which is grounded through a grounding resistor so that individual ones of said output terminals exist at substantially ground potential only when none of the input leads associated therewith are positive, a bank of secondary rectifiers, said secondary rectifiers being arranged to serially join a portion of said terminals to said carry output lead and another portion to said write lead, auxiliary sources of potential having a high resistance included in series therewith, said write and carry output leads being respectively connected to said auxiliary sources of potential and said secondary bank of rectifiers being so polarized that a voltage couple representative of a binary 1 is impressed upon said carry output lead when two or more of said direct input leads carry binary 1 voltage couples and so that a voltage couple representative of a binary 1 is impressed upon said write output lead when either one or three of said direct input leads carry binary 1 voltage couples.

21. In a computer of the binary type, the combination comprising means for storing data representative of a series of binary digits, means for converting each digit of such data into either a plus-minus sinusoidal wave or a minus-plus sinusoidal wave depending upon the value of the digit, means including a flip-flop circuit having two stable conditions of operation, the order in which the flip-flop circuit assumes first one and then the other of its two conditions of operation being determined by the wave supplied thereto, said flip-flop circuit including means for unlocking the same to enable response to the then existing polarity of the sinusoidal wave, and means for applying an unlocking pulse synchronized with the region of maximum amplitude of each half of said sinusoidal wave.

22. In a binary computer the combination comprising data sources supplying first and second data signals, said signals consisting of a series of plus-minus and minus-plus voltage couples to represent binary digits, means including a two-condition device for operating on such signals to produce along with said data signals additional signals which are the respective inversions thereof, and a summing circuit having unidirectional control devices therein, said control devices being connected to respond not only to said data signals but to said inverted signals as well, means in said summing circuit and cooperating with said control devices to produce at the output terminals of the summing circuit a signal consisting of voltage couples indicative of the sum of the simultaneously received digits represented by said data signals, and alarm means for detecting the failure of any couple at the output of the summing circuit to have both a minus and a plus condition.

23. In a computer of the type employing the binary system of numbers and in which the individual binary digits are represented on a voltage lead by a plus-minus or minus-plus voltage couple depending on the value of the digit, an alarm circuit for coupling to said lead comprising means synchronized for response to the first half of a given couple for producing a voltage representative of the polarity thereof, means synchronized for response to the second half of said voltage couple for producing a voltage representative of the polarity of said second half, and means for comparing said voltages to indicate lack of voltage change in said couple.

24. In a computer of the type employing the binary system of numbers and in which the individual binary digits are represented in a voltage lead by a plus-minus or minus-plus voltage couple depending on the value of the digit, an alarm circuit for coupling to said lead comprising means synchronized for response to the first half of a given couple for producing a first reference voltage representative of the polarity thereof, means synchronized for response to the second half of said voltage couple for producing a second reference voltage, means for delaying the production of said first reference voltage so that it exists simultaneously with said second reference voltage, and means for comparing said reference voltages to indicate lack of reversal in said couple.

25. In a computer of the type employing the binary system of numbers and in which the individual binary digits are represented on a voltage lead by a plus-minus or minus-plus voltage couple depending on the value of the digit, an alarm circuit for coupling to said lead comprising means synchronized for response to the first half of a given couple for producing a first reference voltage representative of the polarity thereof, means synchronized for response to the second half of said voltage couple for producing a second reference voltage representative of the polarity of said second half, means for retaining said first reference voltage so that it exists simultaneously with said second reference voltage, and means for indicating a condition of alarm when said reference voltages are of the same polarity.

26. In a computer of the type employing the binary system of numbers and in which the individual binary digits are represented on a voltage lead by a plus-minus or minus-plus voltage couple depending upon the value of the digit, an alarm circuit for coupling to said lead comprising a first flip-flop device synchronized for response to the first half of a given couple for producing a first reference voltage representative of the polarity thereof, a second flip-flop device synchronized for response to the second half of said voltage couple for producing a second reference voltage representative of the polarity thereof, a third flip-flop device also synchronized for response to the second half of said voltage couple for delaying said first reference voltage one-half cycle so that it exists simultaneously with said second reference voltage, and means for indicating a condition of alarm when said reference voltages are non-complementary.

27. In a computer of the type employing the binary system of numbers and in which the individual binary digits are represented on a voltage lead by a plus-minus or minus-plus voltage couple depending upon the value of the digit, an alarm device for coupling to said lead comprising means for producing simultaneously existing reference voltages representative of the polarity of the first and second halves of a given couple, means for producing the complements of said reference voltages, means including a first vacuum tube having two control grids respectively responsive to said reference voltages so that the tube conducts when said voltages are both positive, and means including a second vacuum tube having two control grids respectively responsive to the complements of said reference voltages and arranged to conduct when said complement voltages are both positive, and means for indicating a condition of alarm upon the flow of current in either of said vacuum tubes.

28. In a binary computer the combination comprising sources for supplying first and second input signals, said signals each consisting of a train of plus-minus and minus-plus voltage couples, each couple representing one or the other of two binary digits respectively, means including inverters for said input signals respectively and each having terminals carrying the direct input signal and its inversion, a summing circuit having unidirectional control devices therein, said control devices being arranged for feeding by said terminals, means in said summing circuit and associated with said control devices for producing at the output terminals of the summing circuit a write signal consisting of couples indicative of the sum of the simultaneously received trains of digits represented by said input signals, and means for reversing the terminals associated with one of said inverters to feed the complement of the corresponding input signal into said summing circuit thereby to produce a write signal indicative of the difference between said input signals.

29. In a computer for binary numbers, the combination comprising, a storage device for storing data representative of a train of binary digits in the form of successive areas of magnetism, means for converting each area of magnetism into a plus-minus or minus-plus input voltage couple depending upon whether the digit represented thereby is a binary 1 or a binary 0, a computing circuit arranged for energization by a train of said couples including means for acting upon the latter in a predetermined manner to produce a train of output voltage couples having mathematical significance, said computing circuit including a flip-flop device having an input connected to receive said input voltage couples and capable of two stable conditions of output voltage, said flip-flop device having an unlocking connection to enable the voltage at the output thereof to aline itself with the voltage at the input only when an unlocking pulse is applied thereto, and means synchronized with the flow of couples from said storage device to provide unlocking pulses to said circuit.

30. In a computer for binary numbers, the combination comprising, a storage device for storing data representative of a train of binary digits in the form of successive areas of magnetism, means for converting each area of magnetism into a plus-minus or minus-plus voltage couple depending upon whether the digit is a binary 1 or a binary 0 to produce an input train of voltage couples, a computing circuit for acting upon said train of voltage couples in a predetermined manner to produce an output train of voltage couples having mathematical significance, said circuit including a flip-flop device having its input fed by said input train of voltage couples and having two stable conditions of output voltage, said flip-flop device having an unlocking connection and so arranged that the output voltage may flip into alinement with the input voltage only during the instant that a voltage pulse is applied to said unlocking connection, and means synchronized with the flow of voltage couples from said storage device to provide unlocking pulses to said circuit.

31. In a computer for binary numbers, the combination comprising, rotatively driven magnetic means for storing data representative of a train of binary digits in the form of areas of magnetism, reading means for converting each area of magnetism into a plus-minus or minus-plus voltage wave generally sinusoidal in form depending upon whether the digit represented thereby is a binary 1 or a binary 0, a computing circuit having an input and an output circuit and capable of acting upon plus-minus and minus-plus voltage couples of a square wave shape to produce an output train of voltage couples having a mathematical significance at the output thereof, a flip-flop device having its input connected to said reading means and having its output connected to said computing circuit, said flip-flop device having an unlocking connecting and so arranged that its output voltage may flip into alinement with its input voltage only when an unlocking pulse is applied to the unlocking connection, and a triggering circuit having an element synchronized with the movement of said magnetic storage means to provide unlocking pulses to said flip-flop device near the peaks of the positive and negative voltages of the sinusoidal voltage wave.

32. In a computer for binary numbers, the combination comprising, first and second data sources in the form of rotating magnetic members coupled together for storing successive couples of magnetism representative of trains of binary digits, first and second reading means for converting each couple of magnetism into a plus-minus or minus-plus voltage couple of generally sinusoidal form depending upon whether the digit is a binary 1 or a binary 0, a computing circuit having input terminals and arranged to act upon trains of input voltage couples so that an output train of voltage couples is produced having mathematical significance, first and second flip-flop devices having their inputs respectively connected to said reading means and having their outputs connected to the input terminals of said computing circuit, said flip-flop devices each having an unlocking connection and being so arranged that the output voltage alines itself with the then existing input voltage only when an unlocking pulse is applied to form a square output wave, and means including a synchronizing magnetic member rotatively coupled to said rotating magnetic members and connected to the unlocking connections of said first and secod flip-flop devices to supply simultaneous pulses thereto so that the square voltage couples from the flip-flop devices are fed into the computing circuit in precise synchronism with one another in spite of relatively wide phasing variations in the sinusoidal voltage couples read from said rotating magnetic members by said reading means.

33. In a computer for binary numbers, the combination comprising, first and second data sources in the form of rotating magnetic disks for preliminarily storing magnetic couples representative of trains of binary digits, first and second reading means for converting each magnetic couple into a plus-minus or minus-plus voltage couple of generally sinusoidal wave shape depending upon whether the magnetic couple represents a binary 1 or a binary 0, a computing circuit having input terminals and arranged to act upon trains of voltage couples so that an output train of voltage couples is produced having mathematical significance, an output disk for recording the output train in the form of a series of magnetic couples, first and second flip-flop devices having their inputs respectively connected to said reading means and having their outputs connected to the input terminals of said computing circuit, said flip-flop devices each having an unlocking connection and being so arranged that the output voltage alines itself with the then existing input voltage only when an unlocking pulse is applied so that the sinusoidal couples are converted to couples of square wave shape, means including a synchronizing disk arranged to supply unlocking pulses to both of said flip-flop devices simultaneously, and means for driving all of said disks rigidly coupled to one another so that the data is fed into and recorded from the computing circuit in precise synchronism in spite of phasing variations in the sinusoidal voltage couples read from said rotating magnetic members by said reading means.

34. In a computer for binary numbers, the combination comprising first and second data storage devices for storing magnetic couples representative of trains of binary digits, first and second reading means associated with said storage devices for converting each magnetic couple thereon into a generally sinusoidal plus-minus or minus-plus voltage couple depending upon whether the magnetic coupler represents a binary 1 or a binary 0, first and second flip-flop devices having their input circuits respectively connected to the reading means for converting the sinusoidal voltage couples into square voltage couples, said flip-flop devices having provision for applying an unlocking pulse thereto and being so arranged and constructed that the output voltage flips into alinement with the input voltage only when an unlocking pulse is applied, a digit adding circuit having input terminals respectively connected to the outputs of said flip-flop devices and having a carry input terminal, said digit adding circuit also having output circuits for producing a train of voltage couples representative of the sum of the digits received at the input terminals thereof as well as a train of carry digits, a carry delay circuit connected to said digit adder circuit for delaying each carry digit and inserting it for addition with the digits in the next higher order, said carry delay circuit having an unlocking connection, and synchronizing means including a member coupled for rotation with the data storage devices for applying unlocking pulses both to said flip-flop devices and to said carry delay circuit to insure that the digits supplied to said digit adder circuit remain in exact synchronism in spite of misphasing of the sinusoidal voltage couples from said first and second reading means.

35. In a binary computer of the type in which the digits comprising a binary number are acted upon in timed sequence, the combination comprising, a summing circuit having first and second input leads and having an output lead, said summing circuit being so constructed and arranged that upon reception of trains of voltage impulses at the input leads a train of voltage impulses is produced at the output lead which is representative of the sum of the input trains, a source of electrical impulses representative of binary zeros, means including an insertion lead for inserting an impulse corresponding to a binary 0 into the addition of impulses representing digits of lowest order received at the input leads, a first inverter in one of said input leads to invert the impulses flowing therethrough so that the difference instead of the sum of the two binary numbers appears at the output lead, and a second inverter included in said insertion lead for inserting an impulse corresponding to a binary 1 instead of a binary 0 into the sum of the impulses of lowest order as an incident to inversion in said first inverter.

36. In a binary computer of the type in which a binary digit is represented by a plus-minus or minus-plus voltage couple depending upon whether the digit is a binary 1 or a binary 0, the combination comprising first and second data sources for supplying respective trains of voltage couples representative of binary numbers, said sources being coupled together so that the couples supplied by the sources are synchronized order by order, a digit adder circuit having three pairs of input leads, inverters energized by said data sources for supplying to the first and second pair of input leads direct input signals and the respective inversions thereof, said digit adder having an output lead and a carry lead and so constructed and arranged that (a) a voltage couple representing a binary 1 occurs at the output lead when the sum of the digits applied to the direct input leads is 1 or 3 and (b) a couple representing a binary 1 appears at the carry lead when the sum of the digits applied to the direct input leads is either 2 or 3, a carry delay circuit having its input connected to the carry lead, said carry delay circuit including an inverter and having its output connected to the third pair of input leads to feed a direct and inverted voltage couple thereto which is delayed for addition with the voltage couples of the next higher order, and means for receiving the sum of the binary numbers in the form of voltage couples fed from said output lead.

37. In a computer for performing addition of two binary numbers order by order, a delay device for delaying a carry digit signal from one order for inclusion with the next higher order comprising, in combination, a series of serially-connected flip-flop circuits each having an unlocking connection and so arranged that the output voltage thereof comes into alignment with the existing input voltage upon applying a momentary unlocking pulse thereto and stably persists when the unlocking pulse is removed, means for applying an unlocking pulse to the first flip-flop circuit of the series during a digit signal for responding to the signal, and means for applying an unlocking pulse to the last flip-flop circuit of the series at the beginning of the next following digit signal so that said carry digit signal arrives at the output of the delay device in time for the digit represented thereby to be included in the next higher order.

38. In a computer for performing addition of two binary numbers order by order in which the two digits are represented by plus-minus and minus-plus voltage couples respectively each having a duration of one digit interval, a delay device for delaying a carry digit signal from one order for inclusion with the next higher order comprising, in combination, a series of serially-connected flip-flop circuits each having an unlocking connection and so arranged that the output voltage thereof comes into alignment with the existing input voltage upon applying a momentary unlocking pulse thereto and stably persists when the unlocking pulse is removed, means for applying an unlocking pulse to the first and third flip-flop circuits of the series during the first half and second half of a digit interval, and means for applying an unlocking pulse to the second and fourth flip-flop circuits of the series at the mid-point of the digit interval and at the beginning of the next following digit interval so that said carry digit signal arrives at the output of the delay device in time for the digit represented thereby to be included in the next higher order.

39. In a computer of the binary type in which the two binary digits are represented by a plus-minus and minus-plus voltage couple for performing addition of two binary numbers order by order, a delay device for carrying a carry digit signal from one order to the next higher order comprising, in combination, a series of four serially-connected flip-flop circuits, each of said flip-flop circuits having an unlocking connection and so arranged that the output voltage comes into alignment with the existing input voltage upon applying a momentary unlocking pulse to said unlocking connection with the output voltage persisting stably when the unlocking pulse is removed, means for applying unlocking pulses to the first and third flip-flop circuits at the one-quarter point and three-quarter point of the voltage couple and means for applying an unlocking pulse to the second and fourth flip-flop circuits at the second and fourth quarter points of the voltage couple so that the carry digit signal arrives at the output of the delay device in time to be included in the next higher order.

40. In a binary computer of the type which acts sequentially on a train of digits forming a binary number, the combination comprising a summing circuit having first and second input leads and having an output lead, means for feeding voltage couples representative of a first train of digits into said first input lead and voltage couples representative of a second train of digits into said second input lead with the couples synchronized order by order, said summing circuit having a carry delay device included therein for storing a voltage couple representative of a carry digit from one order for delayed addition with the voltage couples corresponding to the next higher order entering on said input leads so that there is produced on the output lead a train of voltage couples which is representative of the sum of the digits represented by the voltage couples applied to said input leads, and means for adding a voltage couple representative of a binary 0 to the voltage couples of lowest order in place of the voltage couple from said carry delay device and which was stored in a previous step of computation.

41. In a binary computer of the type which acts sequentially on a train of digits forming a binary number, the combination comprising first and second data storage devices for storing areas of magnetism of polarity representative of a train of binary digits and having means for driving the same, a summing circuit having first and second input leads, means respectively associated with said data storage devices to convert the areas of magnetism into corresponding electrical impulses for application to said input leads, said data storage devices being coupled for movement together so that the digits therefrom are applied to said input leads synchronized order by order, said summing circuit including a digit adder as well as a carry delay circuit for storing an electrical impulse representing a carry digit from one order for addition with the electrical impulses arriving at said input leads and which are of the next higher order, means including a source of electrical impulses representative of binary zeros and synchronized with the flow of electrical impulses in said input leads, and switch means effective during the arrival of the electrical impulses corresponding to the digits of lowest order for disabling the carry delay circuit and for substituting an impulse corresponding to a binary 0 to prevent carryover of the carry digit from the highest order of the previous step of computation.

42. In a binary computer of the type in which the binary digits comprising a number are acted upon in timed sequence, the combination comprising first and second data storage devices for storing binary numbers in the form of spots of magnetism, a summing circuit having first and second input leads connected to said data storage devices respectively, said storage devices being coupled together so that trains of electrical impulses representative of digits are fed into said input leads synchronized order by order, said summing circuit having an output lead and having means for receiving the signal therefrom, said summing circuit including a carry delay circuit so that the impulse representative of the carry digit resulting from the addition of impulses representing the digits in one order is stored temporarily and then summed with the impulses representing the digits of next higher order so that a train of impulses is produced in said output lead indicative of the sum of the trains of impulses simultaneously received at said input leads, an inverter in one of said input leads capable of inverting the impulses comprising the signal flowing therethrough so that impulses representing the difference of the stored binary numbers rather than their sum is produced at the output lead, and means for adding to the impulses of lowest order only on impulse corresponding to a binary 1.

43. In a high speed digital computer, the combination comprising first and second data storage devices in which the data are represented by two-condition couples with the order of the two successive conditions in the couple representing the binary digits 1 and 0 respectively, means for simultaneously reading the couples of corresponding order in said storage devices and for converting them into trains of plus-minus and minus-plus voltage couples synchronized with one another order by order, means for combining simultaneously received pairs of voltage couples in sequence, means responsive to the coincidence or lack of coincidence in the polarity of the voltages at said combining means to produce a train of voltage couples representative of a train of digits comprising the answer to a mathematical problem, and an answer storage device coupled to said data storage device for making synchronously a record of the train of voltage couples comprising said answer.

44. In a high speed digital computer, the combination comprising first and second data storage devices in which the data are represented by two-condition couples of square wave form with the order of the two successive conditions in the couple representing the binary digits 1 and 0 respectively, means for simultaneously reading the couples of corresponding order in said storage devices and for converting them into trains of plus-minus and minus-plus voltage couples synchronized with one another order by order with the half-waves thereof in step, means for combining simultaneously received pairs of voltage couples in sequence, means responsive to the coincidence or lack of coincidence in the polarity of the voltages at said combining means during each half-wave to produce a train of voltage couples representative of a train of digits comprising the answer to a mathematical problem, and an answer storage device coupled to said data storage device for making synchronously a record of the train of voltage couples comprising said answer.

GEORGE R. STIBITZ.

REFERENCES CITED

The following references are of record in the file of this patent:

UNITED STATES PATENTS

| Number | Name | Date |
|---|---|---|
| 1,074,424 | Fessenden | Sept. 30, 1913 |
| 2,026,330 | Tauschek | Dec. 31, 1935 |
| 2,306,386 | Hollywood | Dec. 29, 1942 |
| 2,378,383 | Arndt | June 19, 1945 |
| 2,424,218 | Begun | July 22, 1947 |
| 2,429,227 | Herbst | Oct. 21, 1947 |
| 2,429,228 | Herbst | Oct. 21, 1947 |
| 2,484,081 | Dickinson | Oct. 11, 1949 |

OTHER REFERENCES

Electronic Counters, Grosdoff, R. C. A. Review, pp. 439 and 440, Sept. 1946.

High-Speed N-Scale Counters, Sharpless Electronics, pp. 122–125, March 1948.